(12) United States Patent
Takezoe et al.

(10) Patent No.: US 10,287,501 B2
(45) Date of Patent: May 14, 2019

(54) LIQUID CRYSTAL DISPLAY ELEMENT

(71) Applicants: TOKYO INSTITUTE OF TECHNOLOGY, Tokyo (JP); TOKYO UNIVERSITY OF SCIENCE EDUCATIONAL FOUNDATION ADMINISTRATIVE ORGANIZATION, Tokyo (JP); DIC Corporation, Tokyo (JP)

(72) Inventors: Hideo Takezoe, Tokyo (JP); Satoshi Aya, Tokyo (JP); Takashi Yamashita, Nagareyama (JP); Kunihiko Okano, Yokohama (JP)

(73) Assignees: TOKYO INSTITUTE OF TECHNOLOGY, Tokyo (JP); TOKYO UNIVERSITY OF SCIENCE EDUCATIONAL FOUNDATION ADMINISTRATIVE ORGANIZATION, Tokyo (JP); DIC Corporation, Tokyo (JP)

(*) Notice: Subject to any disclaimer, the term of this patent is extended or adjusted under 35 U.S.C. 154(b) by 218 days.

(21) Appl. No.: 13/789,072

(22) Filed: Mar. 7, 2013

(65) Prior Publication Data

US 2013/0235290 A1 Sep. 12, 2013

(30) Foreign Application Priority Data

Mar. 8, 2012 (JP) .................................. 2012-052244

(51) Int. Cl.
*C09K 19/24* (2006.01)
*C09K 19/20* (2006.01)
(Continued)

(52) U.S. Cl.
CPC .............. *C09K 19/24* (2013.01); *C09K 19/02* (2013.01); *C09K 19/20* (2013.01); *C09K 19/22* (2013.01);
(Continued)

(58) Field of Classification Search
None
See application file for complete search history.

(56) References Cited

U.S. PATENT DOCUMENTS 5,178,794 A * 1/1993 Takatsu .................. C07C 43/21
252/299.6
2010/0103365 A1* 4/2010 Lee et al. ...................... 349/167
(Continued)

FOREIGN PATENT DOCUMENTS

JP 59024756 A * 2/1984
JP H06-100861 A 4/1994
(Continued)

OTHER PUBLICATIONS

Kimoto et al., "Anomaly of Pretransitional Behavior at the Nematic-Smectic—A Phase Transiation of Amophphilic Liquid Crystals with a Hydrophilic Group", Apr. 25, 2013, The Journal of Physical Chemistry B, 117, 6290-6293.*
(Continued)

*Primary Examiner* — Cynthia H Kelly
*Assistant Examiner* — Anna Malloy
(74) *Attorney, Agent, or Firm* — Westerman, Hattori, Daniels & Adrian, LLP

(57) ABSTRACT

A liquid crystal display element having an improved response speed by using a liquid crystal compound having a high $K_{33}$, while neither improving nor deteriorating all the characteristics as a liquid crystal display element. The liquid crystal display element 10 of the present invention has a first substrate 15, a second substrate 15', and a liquid crystal (Continued)

composition layer 5 interposed between the first substrate 15 and the second substrate 15', wherein at least one of the first substrate 15 and the second substrate 15' has an electrode that controls the liquid crystal composition layer 5 and the bend elastic constant $K_{33}$ of at least one kind of liquid crystal compounds in the liquid crystal composition constituting the liquid crystal composition layer 5 is 20 pN or more.

11 Claims, 2 Drawing Sheets

(51) Int. Cl.

| | | |
|---|---|---|
| *C09K 19/22* | (2006.01) | |
| *C09K 19/34* | (2006.01) | |
| *C09K 19/02* | (2006.01) | |
| *G02F 1/133* | (2006.01) | |
| *C09K 19/04* | (2006.01) | |
| *C09K 19/12* | (2006.01) | |
| *C09K 19/18* | (2006.01) | |
| *C09K 19/16* | (2006.01) | |

(52) U.S. Cl.
CPC ...... *C09K 19/3402* (2013.01); *G02F 1/13306* (2013.01); *C09K 2019/0466* (2013.01); *C09K 2019/122* (2013.01); *C09K 2019/123* (2013.01); *C09K 2019/161* (2013.01); *C09K 2019/163* (2013.01); *C09K 2019/183* (2013.01)

(56) References Cited

U.S. PATENT DOCUMENTS

| | | | | |
|---|---|---|---|---|
| 2010/0309398 | A1* | 12/2010 | Klement et al. | 349/33 |
| 2011/0297881 | A1* | 12/2011 | Hirata | C07D 309/06 |
| | | | | 252/299.61 |
| 2012/0074355 | A1* | 3/2012 | Kobayashi | 252/299.63 |
| 2013/0114010 | A1* | 5/2013 | Goetz et al. | 349/33 |

FOREIGN PATENT DOCUMENTS

| | | | |
|---|---|---|---|
| JP | 07-181522 A | | 7/1995 |
| JP | 11228967 A | * | 8/1999 |
| JP | 2000313881 A | * | 11/2000 |
| JP | 2002-105033 A | | 4/2002 |
| JP | 2004-300062 A | | 10/2004 |
| JP | 2007-529767 A | | 10/2007 |
| JP | 2009-249406 A | | 10/2009 |
| JP | 2010-527037 A | | 8/2010 |
| JP | 2010-217853 A | | 9/2010 |
| JP | 2011068591 A | * | 4/2011 |
| JP | 2011-231099 A | | 11/2011 |
| JP | 2011-236178 A | | 11/2011 |
| WO | 2005/096085 A1 | | 10/2005 |
| WO | 2008/138456 A1 | | 11/2008 |
| WO | WO 2010146992 A1 | * | 12/2010 |
| WO | WO 2012022391 A2 | * | 2/2012 |

OTHER PUBLICATIONS

Yoshizawa et al. "Interlayer Interactions Induced by Amphiphilicities of a Rod-Like Molecule Produce Frustrated Strcutures in Conventional Calamitic Phases", Oct. 4, 2010, The Jorunal of Physical Chemistry B, 114, 13304-13311.*
English translation of JP2004300062.*
Kuvshinova et al., "Mesogenic 4-[4-(ω-Hydroxyalkoxy)phenyl]diazenylcinnamic Acids and Their 4-Cyanophenyl Esters", 2009, Russian Journal of Organic Chemistry, vol. 45 No. 2, 182-184. (Year: 2009).*
English translation of JP59024756. (Year: 1984).*
English translation of JP2000313881. (Year: 2000).*
English translation of JP11228967. (Year: 1999).*
English translation of JP2011068591. (Year: 2011).*
Original—Li et al., "Synthesis and mesomorphic properties of 4-trifluoromethoxycinnamate type liquid crystals", 2001, Chinese Journal of Liquid Crystals and Displays, vol. 16, No. 2, 114-119. (Year: 2001).*
Translation—Li et al., "Synthesis and mesomorphic properties of 4-trifluoromethoxycinnamate type liquid crystals", 2001, Chinese Journal of Liquid Crystals and Displays, vol. 16, No. 2, 114-119. (Year: 2001).*
Novikova et al., "Synthesis, molecular structure, and mesomorphism of trans-4-(5-pentyl-1,3-dioxane-2-yl)pheny1-3-(4-fluorophenyl) propenate", Sep. 1993, Krystallografiya, 38, 98-104. (Year: 1993).*
Office Action dated Mar. 22, 2016, issued in counterpart Japanese Patent Application No. 2012-052244, with English translation. (8 pages).
Office Action dated Oct. 4, 2016, issued in counterpart Japanese Application No. 2012-052244, with English translation (9 pages).

* cited by examiner

LIQUID CRYSTAL DISPLAY ELEMENT

BACKGROUND OF THE INVENTION

Field of the Invention

The present invention relates to a liquid crystal display element which is useful as an electro-optical liquid crystal display material.

Description of Related Art

An active matrix type liquid crystal display device has excellent display quality, and thus has been used in mobile terminals, liquid crystal television sets, projectors, computers, or the like, and has penetrated the market. For the active matrix display mode used in display devices, TFT (Thin Film Transistor), MIM (Metal Insulator Metal), and the like are used, and in this mode, it is important that they have a high voltage maintenance ratio. Further, in order to obtain wider visual characteristics, a TFT display formed by a combination with VA (Vertical Alignment) mode, an IPS (In-Plane-Switching) mode, an OCB (Optically Compensated Bend) mode, and the like has been proposed, or in order to obtain lighter display, a reflective type of an ECB (Electrically Controlled Birefringence) mode has been proposed. In response to such a display element, new liquid crystal compound or liquid crystal compositions are still currently being proposed.

It has been known that an increase in $K_{33}$ (bend elastic constant) can improve the response speed with respect to the electric field of a liquid crystal molecule in any of various modes of TN (Twisted Nematic), STN (Super Twisted Nematic), VA, and the like.

For example, in Published Japanese Translation No. 2007-529767 of the PCT International Publication, a composition having a relatively higher $K_3$ (bend elastic constant) of 36.7 pN has been disclosed.

SUMMARY OF THE INVENTION

However, in the composition disclosed in Published Japanese Translation No. 2007-529767 of the PCT International Publication, the individual compounds constituting the composition do not have such a high $K_3$. Therefore, when the composition is intended to be used as an additive to increase $K_{33}$, there is a concern about adverse effects on all the characteristics as a liquid crystal display element, such as liquid crystal temperature ranges, dielectric anisotropy, refractive index anisotropy, and viscosity.

In one embodiment, there is provided a liquid crystal display element having an improved response speed using a liquid crystal compound having a high $K_{33}$ while neither improving nor deteriorating all the characteristics as a liquid crystal display element.

In order to solve the above-described problems, the present inventors have found that the response speed of the liquid crystal display element can be improved by using a liquid crystal compound having a predetermined bend elastic constant in the liquid crystal composition layer, thereby completing the present invention.

That is, the present invention relates to a liquid crystal display element having a first substrate, a second substrate, and a liquid crystal composition layer interposed between the first substrate and the second substrate, wherein at least one of the first substrate and the second substrate has an electrode that controls the liquid crystal composition layer and the bend elastic constant $K_{33}$ of at least one kind of liquid crystal compounds in the liquid crystal composition constituting the liquid crystal composition layer is 20 pN or more.

According to the present invention, the response speed of the liquid crystal display element can be improved while improving or not deteriorating all the characteristics as a liquid crystal display element.

DETAILED DESCRIPTION OF THE INVENTION

[Liquid Crystal Display Element]

First Embodiment

The first embodiment of the present invention will be described referring to FIG. 1.

Figure 1:
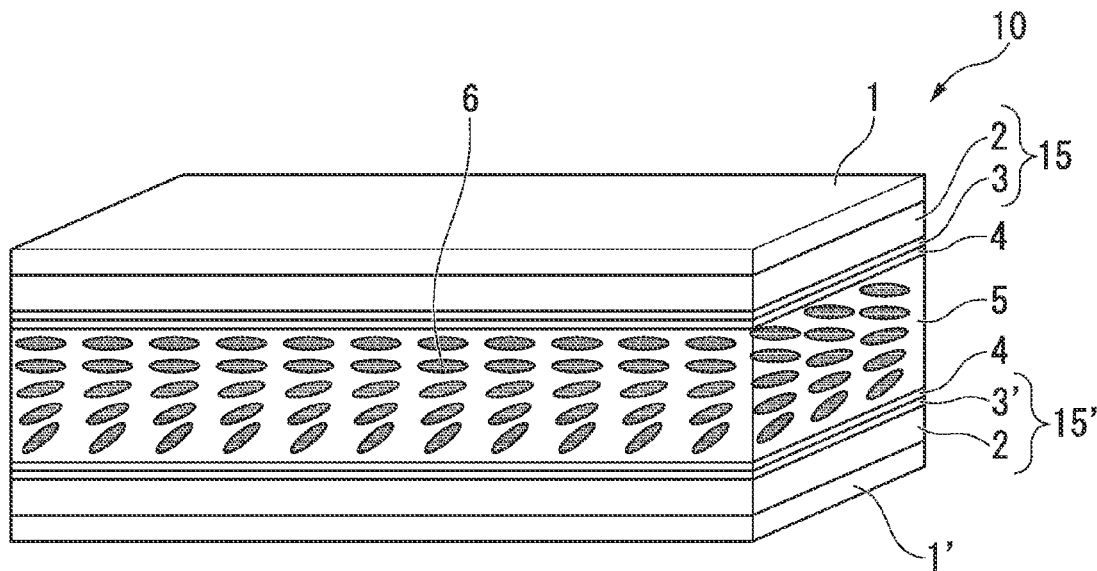
FIG. 1 is a view showing the liquid crystal display element according to the first embodiment.

As shown in FIG. 1, the liquid crystal display element 10 of the present embodiment has a first substrate 15, a second substrate 15', and a liquid crystal composition layer 5 interposed between the first substrate 15 and the second substrate 15'. The first substrate 15 and the second substrate 15' have transparent electrodes 3 and 3', each of which controls the liquid crystal composition layer 5, and the bend elastic constant $K_{33}$ of at least one kind of liquid crystal compounds in the liquid crystal composition constituting the liquid crystal composition layer 5 is 20 pN or more.

The first substrate 15 and the second substrate 15' are provided with a glass substrate 2. Further, the opposing surface in the first substrate 15 and the second substrate 15' is provided with alignment films 4 and 4, respectively.

In the case where the liquid crystal display element of the present embodiment is of a horizontal alignment type, such as a TN mode and an STN mode, the alignment films 4 and 4 align the liquid crystal molecules 6 of the liquid crystal composition layer 5 on the glass substrate 2 substantially horizontally (horizontal alignment) when no electric field is applied. Here, the expression, substantially horizontally, includes horizontally and approximately horizontally.

In the case where the liquid crystal display element of the present embodiment is of a vertical alignment type such as a VA mode, the alignment films 4 and 4 align the liquid crystal molecules 6 of the liquid crystal composition layer 5 on the glass substrate 2 substantially vertically (vertical alignment) when no electric field is applied. Here, the expression, substantially vertically, includes vertically and approximately vertically.

The glass substrate 2 in the first substrate 15 and the second substrate 15' is provided with transparent electrodes 3 and 3' as a voltage applying means that applies an electric field vertical to the substrate surface on the side of the liquid crystal composition layer 5. The transparent electrodes 3 and 3' consist of transparent electrode materials such as ITO (indium tin oxide).

The liquid crystal display element of the present embodiment may have either one of a passive matrix display system and an active matrix display system.

In the case where the liquid crystal display element of the present embodiment has the passive matrix display system, it includes an STN mode. In the case where the liquid crystal display element of the present embodiment is in the STN mode, the transparent electrode 3 on the first substrate 15 and the transparent electrode 3' on the second substrate 15' are patterned in a stripe shape as to be orthogonal to each other.

In the case where the liquid crystal display element of the present embodiment has the active matrix display system, it includes a TN mode and a VA mode. The liquid crystal display element has a plurality of pixels and each of the pixels can be independently controlled.

In the case where the liquid crystal display element of the present embodiment is in the TN mode, the transparent electrode 3 included in the first substrate 15 is a common electrode and the transparent electrode 3' included in the second substrate 15' is a pixel electrode.

As the first substrate 15, a color filter substrate is suitably used, and as the second substrate 15', a TFT array substrate is suitably used.

When the electrode is formed on the substrate, usual methods such as vapor deposition, sputtering, and photolithography may be employed.

The alignment films 4 and 4 are provided to cover the transparent electrodes 3 and 3'. Although the materials and formation methods for the alignment films 4 and 4 are not particularly limited, for example, the alignment films 4 and 4 may be formed by coating a known alignment film material having a horizontal alignment regulatory ability or a vertical alignment regulatory ability on the transparent electrodes 3 and 3'.

Furthermore, by subjecting the alignment films 4 and 4' to a rubbing treatment, the alignment direction of the liquid crystal molecules 6 is controlled.

In addition, polarizing plates 1 and 1' (polarizer 1, analyzer 1') are each provided on the surface facing the opposing surfaces of the liquid crystal composition layer 5 in the first substrate 15 and the second substrate 15'. The absorption axes of the polarizer 1 and the analyzer 1' are preferably crossed.

In the case where the liquid crystal display element of the present embodiment is in the TN, IPS, or VA mode, it is more preferable to form an angle of 90° (crossed Nicols).

In the case where the liquid crystal display element of the present embodiment is in the STN mode, it is more preferable to form an angle of 45°.

In the liquid crystal panel in the VA mode, in order to improve the viewing angle characteristics, those obtained by combination of the "alignment division technologies" (multi-domain) of the liquid crystal molecules is preferably used. In order to perform the alignment division, when an electric field is applied from the vertical alignment which is the initial alignment of the liquid crystals, it is necessary to determine the inclination direction of the molecules in advance, and for such a determination of the inclination direction, technology for providing a structure of "ribs" or "slit", technology for stabilizing the inclination alignment of liquid crystals by polymerizing the monomer components present in the bulk or the vicinity of the interface of the liquid crystal composition or present in the alignment film, technology for providing the initial alignment of the liquid crystal molecule with an inclination using a photo-alignment film, or the like is preferably used.

Second Embodiment

The second embodiment of the present invention will be described, referring to FIG. 2.

Figure 2:
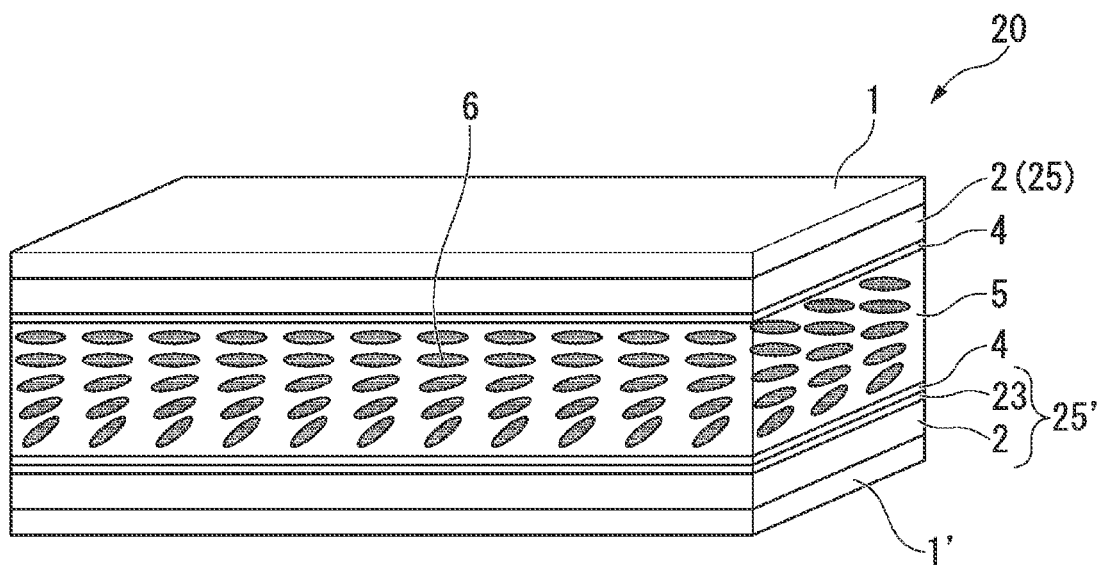
FIG. 2 is a view showing the liquid crystal display element according to the second embodiment.

As shown in FIG. 2, the liquid crystal display element 20 of the present embodiment has a first substrate 25, a second substrate 25', and a liquid crystal composition layer 5 interposed between the first substrate 25 and the second substrate 25'. The second substrate 25' has a transparent electrode 23 that controls the liquid crystal composition layer 5, and the bend elastic constant of at least one kind of liquid crystal compounds in the liquid crystal composition constituting the liquid crystal composition layer 5 is 20 pN or more. In the present embodiment, for the same constitution as the first embodiment, the same symbols are attached and the description thereof will not be repeated.

The first substrate 25 and the second substrate 25' include a glass substrate 2. Further, the opposing surfaces in the first substrate 25 and the second substrate 25' are provided with alignment films 4 and 4, respectively.

In the case where the liquid crystal display element of the present embodiment is of a horizontal alignment type such as an IPS mode, the alignment films 4 and 4 align the liquid crystal molecules 6 of the liquid crystal composition layer 5 on the glass substrate 2 substantially horizontally (horizontal alignment) when no electric field is applied.

The liquid crystal display element of the present embodiment preferably has a plurality of pixels that can be independently controlled, and is more preferably in an active matrix display system. Examples of the active matrix display system include an IPS mode.

In the case where the liquid crystal display element of the present embodiment is in an IPS mode, the second substrate 25' has a transparent electrode 23 (comb-shaped electrode 23) including a common electrode and a pixel electrode. As the second substrate 25', a TFT array substrate is suitably used.

The alignment films 4 and 4 are provided to cover the first substrate 25 and the transparent electrode 23. The materials and formation methods for the alignment films 4 and 4 are the same as in the first embodiment.

Furthermore, by subjecting the alignment films 4 and 4 to a rubbing treatment, the alignment direction of the liquid crystal molecules 6 is controlled.

Next, the liquid crystal composition layer 5 that is used in common in the first embodiment and the second embodiment will be described.

The liquid crystal composition layer 5 is formed by, for example, bonding a periphery using a sealing agent while maintaining a constant interval (cell gap) between the two substrates (the first substrate 15 and the second substrate 15', or the first substrate 25 and the second substrate 25') disposed such that each of the liquid crystal alignment layers faces each other, injecting and filling a liquid crystal composition into the cell gap defined by the substrate surface and the sealing agent, and then sealing the injection hole. In the formation of the liquid crystal composition layer 5, it is preferable to remove the flow alignment during injection by heating to a temperature at which the liquid crystal composition forms an isotropic phase and then slowly cooling to room temperature.

The thickness of the liquid crystal composition layer 5 interposed between the first substrate 15 and the second substrate 15' or between the first substrate 25 and the second substrate 25' is preferably from 1 μm to 10 μm, more preferably from 1 μm to 8 μm, and particularly preferably from 2 μm to 5 μm.

(Guest Compound)

In the first embodiment and the second embodiment (hereinafter also referred to as the present embodiment), the bend elastic constant $K_{33}$ of at least one kind of liquid crystal compounds (hereinafter also referred to as a guest compound) in the liquid crystal composition constituting the liquid crystal composition layer 5 is 20 pN or more. The liquid crystal composition includes a host composition and a guest compound.

The guest compound is intended to be used after being added to a host composition exhibiting a nematic liquid crystal phase, and therefore, the guest compound itself is preferably a compound exhibiting a liquid crystal phase, and more preferably a compound exhibiting a nematic liquid crystal phase.

Furthermore, the guest compound not exhibiting a liquid crystallinity, but potentially exhibiting a liquid crystal phase (for example, exhibiting a latent liquid crystallinity by lowering the melting point) can also be preferably used, and a case where a latent liquid crystal phase is a nematic phase is more preferred.

In addition, since it can be considered that even in the case where a potential liquid crystallinity cannot be confirmed, the compatibility is good when added to the host composition, and in the case where the liquid crystallinity of the host liquid crystal is not significantly reduced, the guest compound has liquid crystallinity, such a case is also preferably used.

The value of the bend elastic constant $K_{33}$ is a value measured as a temperature (defined as T') 20° C. below from the transition temperature ($T_{NI}$) of the isotropic liquid phase-nematic liquid crystal phase. Actual measurement can be performed in the case where the guest compound exhibits a temperature range of the nematic phase of 20° C. or broader, and further in the case where the guest compound exhibits a temperature range of the nematic phase of 20° C. or narrower, the bend elastic constant $K_{33}$ at the temperature T' may be determined by extrapolation from the value of $K_{33}$ in the measurable range. In addition, in the case where the guest compound does not exhibit a nematic phase or the case where the guest compound does not exhibit a measurably stable nematic phase, the bend elastic constant $K_{33}$ at the temperature T' may be determined by extrapolation by mixing the guest compound with other compounds exhibiting a nematic phase.

In order to adjust the physical properties of the liquid crystal composition to desired values, a larger bend elastic constant $K_{33}$ of the guest compound is more preferred, and it is specifically 20 pN or more, preferably 100 pN or more, and more preferably 500 pN or more.

The guest compound preferably has a structure represented by the following general formula (1):

[Chem. 1]

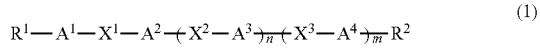

(1)

(wherein $R^1$ and $R^2$ each independently represent a linear or branched alkyl group having 1 to 18 carbon atoms, a fluorine atom, a chlorine atom, a difluoromethyl group, a trifluoromethyl group, a difluoromethoxy group, a trifluoromethoxy group, or a cyano group, and at least one of $R^1$ and $R^2$ is an alkyl group, in which one or more CH$_2$ groups in the alkyl group may be substituted with —O—, —S—, —CO—, —CO—O—, —O—CO—, —CO—S—, —S—CO—, —O—SO$_2$—, —SO$_2$—O—, —O—CO—O—, —CO—N(R$^a$)—, or —N(R$^a$)—CO— such that an oxygen atom and a sulfur atom are not directly adjacent to each other, one or more hydrogen atoms in the alkyl group may be substituted with a CN group or a hydroxyl group, R$^a$ in the —CO—N(R$^a$)— and —N(R$^a$)—CO— represents a hydrogen atom or a linear or branched alkyl group having 1 to 4 carbon atoms, one or more CH$_2$ groups in the alkyl group may be substituted with —CH═CH— or and one or more hydrogen atoms in the alkyl group may be substituted with halogen, $A^1$, $A^2$, $A^3$ and $A^4$ each independently represent any one of the following structures:

[Chem. 2]

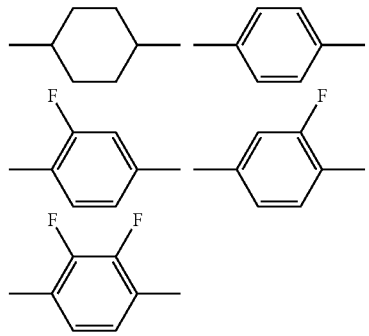

(in the structures, one or more CH$_2$ groups of the cyclohexane ring may be substituted with an oxygen atom, one or more CH groups of the benzene ring may be substituted with a nitrogen atom, and further, one or more hydrogen atoms in the structure may be substituted with Cl, CF$_3$ or OCF$_3$), $X^1$, $X^2$, and $X^3$ each independently represent a single bond, —CH═CH—, —CF═CF—, —C≡C—, —N═N—, —CH═N—N═CH—, —CH$_2$CH$_2$—, —CF$_2$CF$_2$—, —(CH$_2$)$_4$—, —COO—, —OCO—, —OCH$_2$—, —CH$_2$O—, —OCF$_2$—, —CF$_2$O—, —CO—N(R$^a$)—, —N(R$^a$)—CO—, —CH═CH—CO—O—, or —O—CO—CH═CH—, and R$^a$ in —CO—N(R$^a$)—, or —N(R$^a$)—CO— represents a hydrogen atom or a linear or branched alkyl group having 1 to 4 carbon atoms, and n and m each independently represent 0 or 1).

In the general formula (1), $R^1$ and $R^2$ each independently represent a linear or branched alkyl group having 1 to 18 carbon atoms, a fluorine atom, a chlorine atom, a difluoromethyl group, a trifluoromethyl group, a difluoromethoxy group, a trifluoromethoxy group, or a cyano group, and at least one of $R^1$ and $R^2$ is an alkyl group.

Specific examples of the linear alkyl group include a methyl group, an ethyl group, a propyl group, a butyl group, a pentyl group, a hexyl group, a heptyl group, an octyl group, a nonyl group, a decanyl group, an undecyl group, a dodecyl group, a tridecyl group, a tetradecyl group, a pentadecyl group, a hexadecyl group, a heptadecyl group, and an octadecyl group.

Specific examples of the branched alkyl group include an isopropyl group, an isobutyl group, a tert-butyl group, a sec-butyl group, an isopentyl group, a neopentyl group, a tert-heptyl group, an isotridecyl group, and an isohexadecyl group.

The number of carbon atoms of the alkyl group in $R^1$ and $R^2$ is each independently preferably from 1 to 18, and more preferably from 2 to 15.

It is preferable that the alkyl group in $R^1$ and $R^2$ have a strong interaction between the molecules since it strengthens the tendency of the molecules arranged in parallel, and as a result, makes bent deformation difficult, thereby increasing the bend elastic constant $K_{33}$. In order to cause a strong interaction between the molecules, it is preferable that the alkyl group have a polar group. The presence of the polar group in the alkyl group is expected to cause an effect of separating a phase which is a micro-phase from a core portion in the molecule, and as a result, the molecules are promoted to be arranged in parallel, which is thus preferable.

$R^1$ and $R^2$ are each independently as follows: it is preferable that one or more $CH_2$ groups in the alkyl group be substituted with —O—, —S—, —CO—, —CO—O—, —O—CO—, —CO—S—, —S—CO—, —O—$SO_2$—, —$SO_2$—O—, —O—CO—O—, —CO—N($R^a$)—, or —N($R^a$)—CO— such that an oxygen atom and a sulfur atom are not directly adjacent to each other, it is more preferable that two or more $CH_2$ groups be substituted with —O—, and it is particularly preferable that three or more $CH_2$ groups be substituted with —O—.

Here, $R^a$ in the —CO—N($R^a$)— and the —N($R^a$)—CO— represent a hydrogen atom or a linear or branched alkyl group having 1 to 4 carbon atoms, and specifically, —CO—$N(CH_3)$—, —CO—$N(CH_2CH_3)$—, —CO—N$(CH_2CH_2CH_3)$—, —CO—$N(CH_2CH_2CH_2CH_3)$—, —CO—$N(CH_2(CH_3))$—, —CO—$N(CH(CH_3)_2)$—, —CO—$N(C(CH_3)_3)$—, —CO—$N(CH_2CH_2(CH_3)CH_3)$—, —$N(CH_3)$—CO—, —$N(CH_2CH_3)$—CO—, —$N(CH_2CH_2CH_3)$—CO—, —$N(CH_2CH_2CH_2CH_3)$—CO—, —$N(CH_2(CH_3))$—CO—, —$N(CH(CH_3)_2)$—CO—, —$N(C(CH_3)_3)$—CO—, or —$N(CH_2CH_2(CH_3)CH_3)$—CO—. One or more $CH_2$ groups in the alkyl group in the above groups may be substituted with —CH=CH—, or —C≡C—, and one or more hydrogen atoms in the alkyl group may be substituted with halogen.

In addition, $R^1$ and $R^2$ are each independently as follows: it is preferable that one or more hydrogen atoms in the alkyl group be substituted with a CN group or a hydroxyl group, and it is more preferable that one or more hydrogen atoms in the alkyl group be substituted with a hydroxyl group.

In the general formula (1), n and m each independently represent 0 or 1.

In the general formula (1), $A^1$, $A^2$, $A^3$ and $A^4$ each independently represent the following structures.

In addition, the left ends and the right ends in the following structures correspond to the left ends and the right ends of $A^1$, $A^2$, $A^3$ and $A^4$ in the general formula (1), respectively.

[Chem. 3]

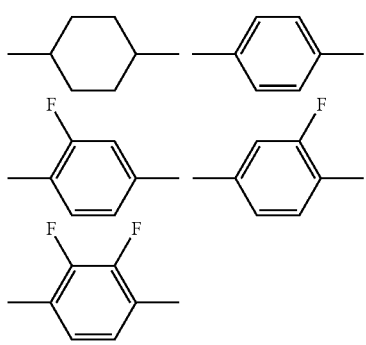

In the cyclohexylene group, one or more $CH_2$ groups of the cyclohexane ring may be substituted with an oxygen atom. That is, $A^1$, $A^2$, $A^3$ and $A^4$ may represent each independently the following structures.

[Chem. 4]

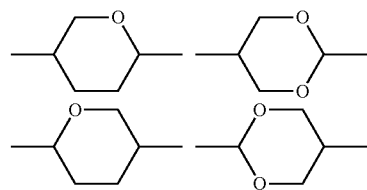

In the phenylene group, the 2-fluorophenylene group, and the 2,3-difluorophenylene group, one or more CH groups of the benzene ring may be substituted with a nitrogen atom. That is, $A^1$, $A^2$, $A^3$ and $A^4$ may each independently represent the following structures.

[Chem. 5]

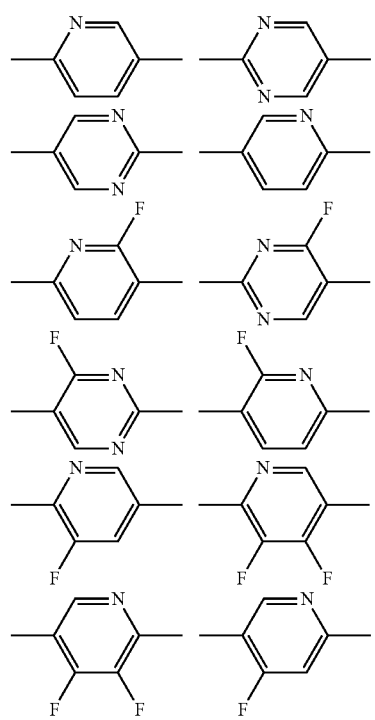

Moreover, in the groups that may be employed as $A^1$, $A^2$, $A^3$ and $A^4$, one or more hydrogen atoms may be substituted with Cl, $CF_3$, or $OCF_3$.

Among the groups as described above, more preferable examples of the groups include a phenylene group, and a phenylene group substituted with fluorine. Particularly, in order to make the dielectric anisotropy negative, lower the melting point, or attain good compatibility with the host composition, substitution with fluorine is preferably used.

In the general formula (1), $X^1$, $X^2$, and $X^3$ each independently represent a single bond, —CH=CH—, —CF=CF—, —C≡C—, —N=N—, —CH=N—N=CH—, —$CH_2CH_2$—, —$CF_2CF_2$—, —$(CH_2)_4$—, —COO—, —OCO—, —$OCH_2$—, —$CH_2O$—, —$OCF_2$—, —$CF_2O$—, —CO—N($R^a$)—, —N($R^a$)—CO—, —CH=CH—CO—O—, or —O—CO—CH=CH—.

Here, $R^a$ in the —CO—N($R^a$)— and the —N($R^a$)—CO— is the same as above.

In order to make the bent deformation difficult to increase the bend elastic constant $K_{33}$, among these, $X^1$, $X^2$, and $X^3$ preferably have a structure maintaining the rigidity of a core. As those maintaining the rigidity of a core, those that become rigid by the steric hindrance of $A^1$, $A^2$, $A^3$ and $A^4$ due to short $X^1$, $X^2$, and $X^3$, those that become rigid in a steric hindrance in the part of $X^1$, $X^2$, and $X^3$ due to two fluorine atoms contained in the same carbon, and those that become rigid by the generation of hindrance in mobility due to inclusion of a double bond or a triple bond in $X^1$, $X^2$, and $X^3$ are more preferred. Specifically, a single bond, —CH=CH—, —CF=CF—, —C≡C—, —N=N—, —OCF$_2$—, or —CF$_2$O— is particularly preferred.

Among these, examples of the guest compound represented by the general formula (1) may include the following compounds.

[Chem. 6]

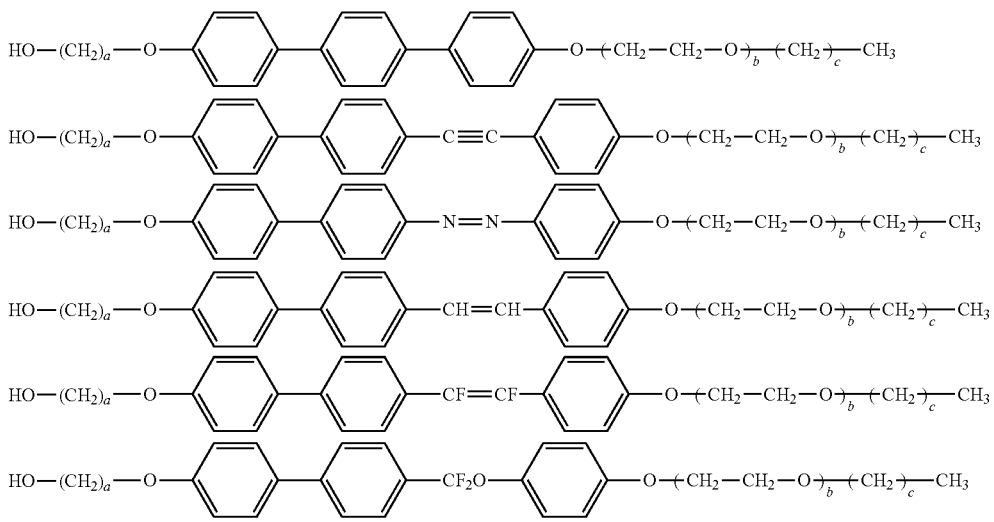

[Chem. 7]

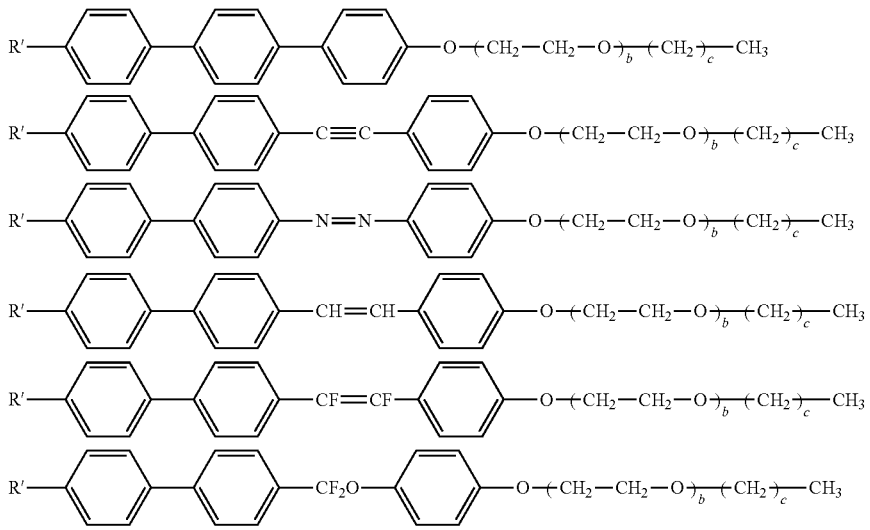

[Chem. 8]

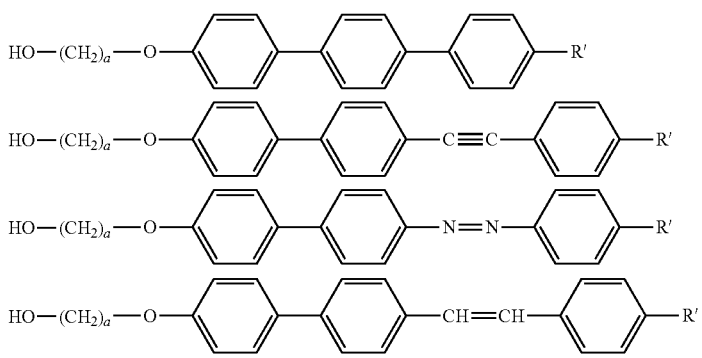

-continued
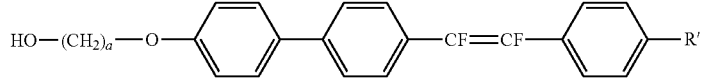
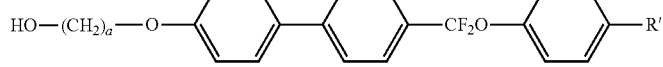
[Chem. 9]
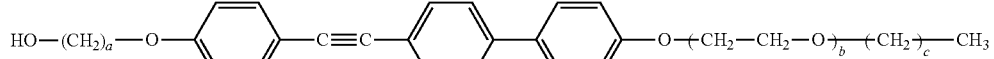
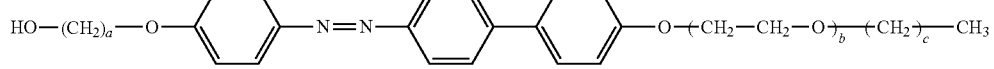
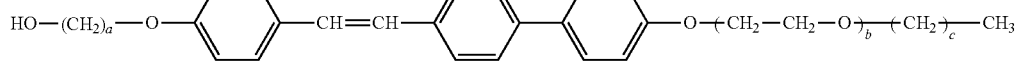
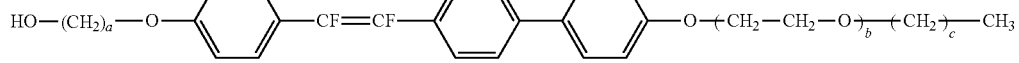
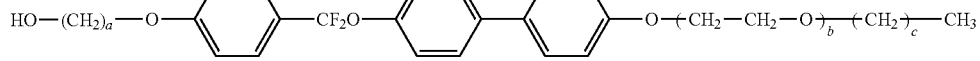
[Chem. 10]
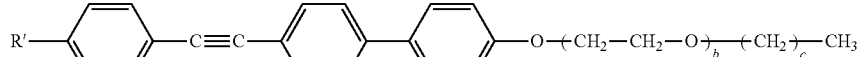
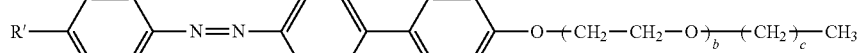
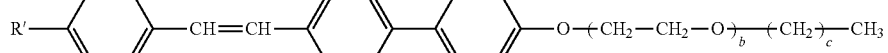
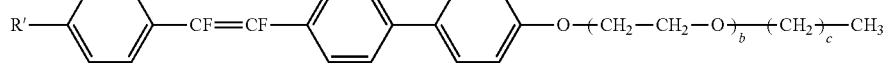
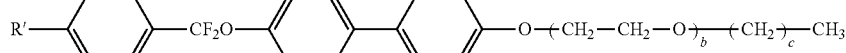
[Chem. 11]
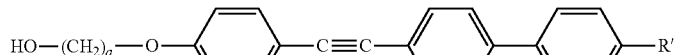
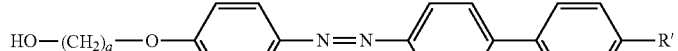
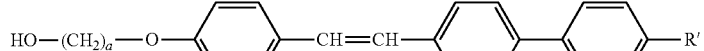
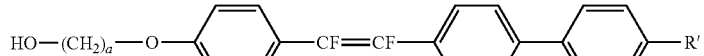
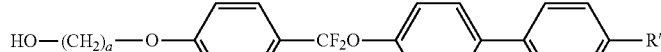
[Chem. 12]
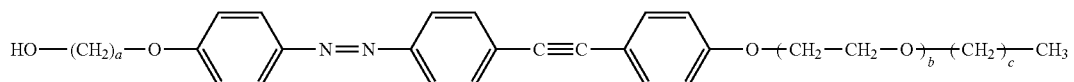
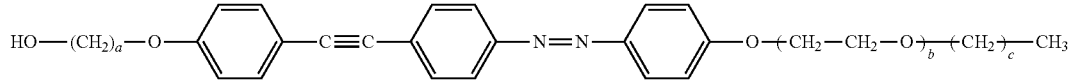

-continued
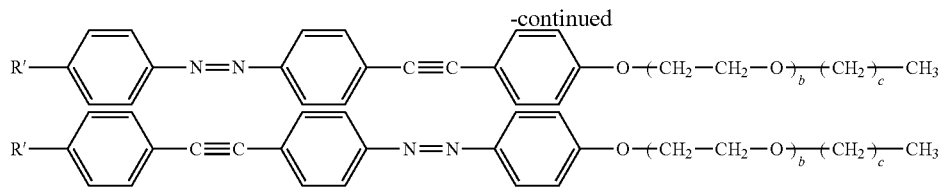
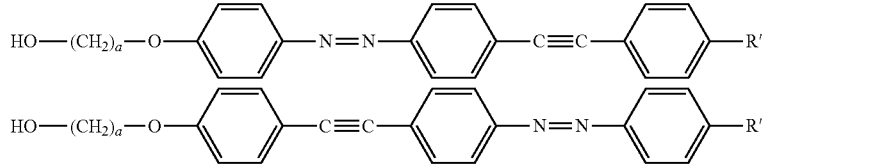
[Chem. 13]
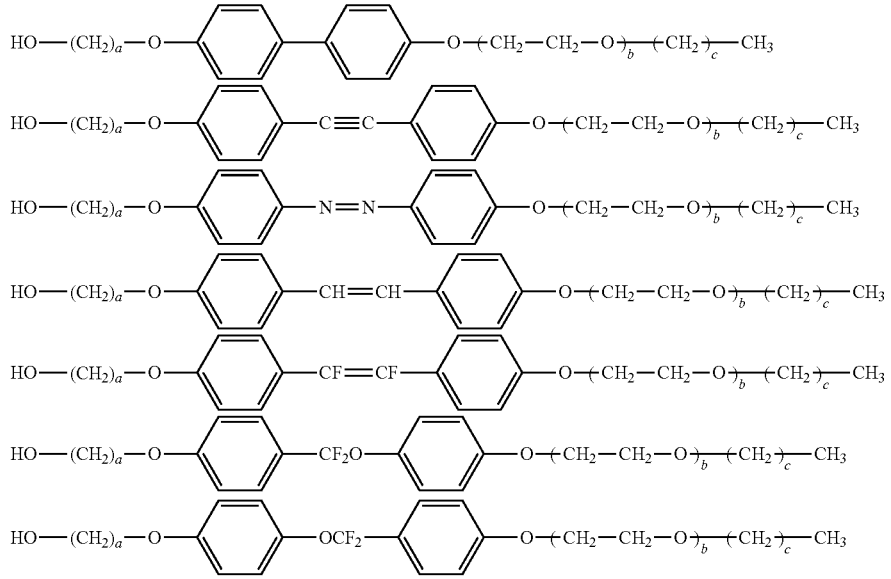
[Chem. 14]
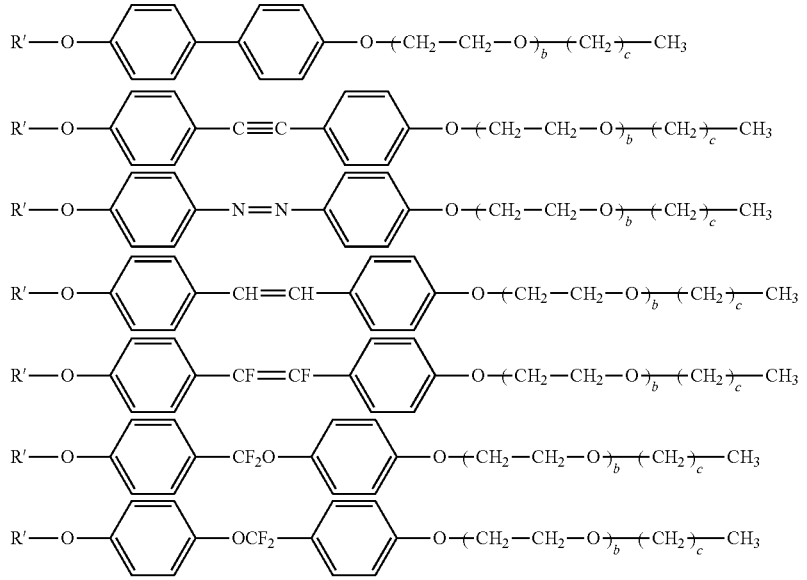
[Chem. 15]
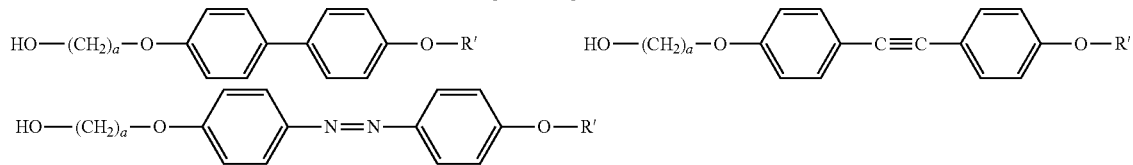

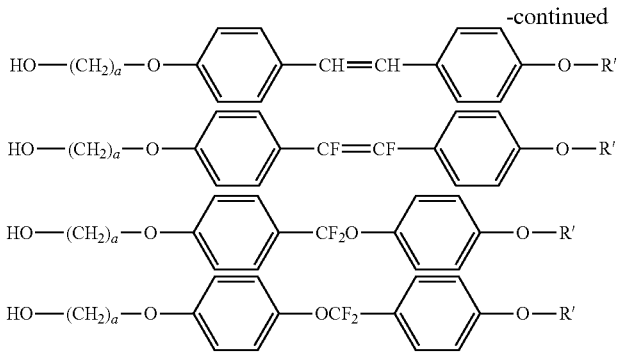

In the compounds, a represents an integer of 1 to 14, b represents an integer of 1 to 4, and preferably an integer of 2 to 4, c represents 0 or 1, and R' represents an alkyl group or alkoxyl group having 1 to 14 carbon atoms. The phenyl ring constituting the compound may be substituted with fluorine.

The guest compound may be used after the content is arbitrarily determined within a range not adversely affecting the adjustment of all the physical properties of the liquid crystal composition, but the liquid crystal composition constituting the liquid crystal composition layer 5 contains the guest compound represented by the general formula (1), preferably in an amount of 0.1% by mass to 90% by mass, more preferably in an amount of 0.1% by mass to 50% by mass, and particularly preferably in an amount of 0.5% by mass to 20% by mass.

As described above, the bend elastic constant $K_{33}$ of the guest compound represented by the general formula (1) is 20 pN or more. In the present embodiment, $K_{33}$ can be increased by using a component having a significantly high $K_{33}$ as a guest compound (additive), while not changing all the characteristics of the liquid crystal composition (host composition) before the addition of the component.

(Host Composition)

In the present embodiment, the liquid crystal composition constituting the liquid crystal composition layer 5 preferably exhibits a nematic liquid crystal phase.

As a host composition constituting the liquid crystal composition, for example, a dicyanobenzene-based liquid crystal compound, a pyridazine-based liquid crystal compound, a Schiff base-based liquid crystal compound, an azoxy-based liquid crystal compound, a naphthalene-based liquid crystal compound, a biphenyl-based liquid crystal compound, a phenylcyclohexane-based liquid crystal compound, a cyanobenzene-based liquid crystal compound, a difluorobenzene-based liquid crystal compound, a trifluorobenzene-based liquid crystal compound, a trifluoromethylbenzene-based liquid crystal compound, a trifluoromethoxybenzene-based liquid crystal compound, a pyrimidine-based liquid crystal compound, or the like is used.

In the case where the liquid crystal display element of the present embodiment is of a vertical alignment type such as a VA mode, an "n type" having a negative dielectric anisotropy is preferred as the liquid crystal composition (host composition) constituting the liquid crystal composition layer 5.

As such a host composition, for example, a dicyanobenzene-based liquid crystal compound, a pyridazine-based liquid crystal compound, a Schiff base-based liquid crystal compound, an azoxy-based liquid crystal compound, naphthalene-based liquid crystal compound, a biphenyl-based liquid crystal compound, a phenylcyclohexane-based liquid crystal compound, or the like is used.

The n type of the liquid crystal composition preferably contains specifically at least one compound selected from the compounds represented by the following general formulae (LC1) through (LC4):

[Chem. 16]

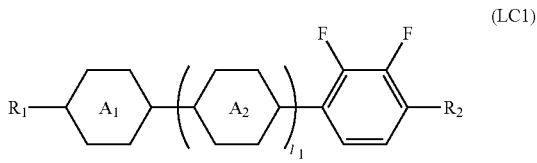
(LC1)

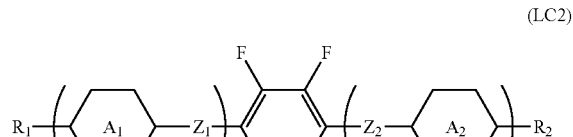
(LC2)

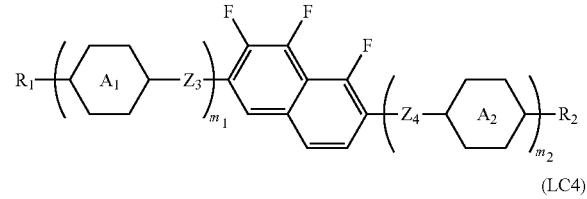
(LC3)

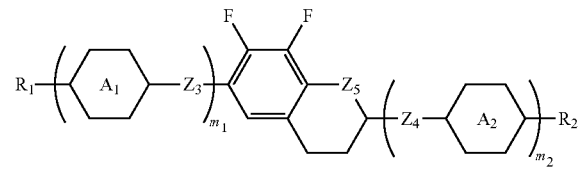
(LC4)

(wherein $R^1$ and $R^2$ each independently represent an alkyl group having 1 to 15 carbon atoms, in which one or more $CH_2$ groups in the alkyl group may be substituted with —O—, —CH=CH—, —CO—, —OCO—, —COO—, —C≡C—, —$CF_2$O—, or —$OCF_2$— such that oxygen atoms are not directly adjacent to each other, one or two or more hydrogen atoms in the alkyl group may be arbitrarily substituted with halogen, and $A_1$ and $A_2$ each independently represent any one of the following structures:

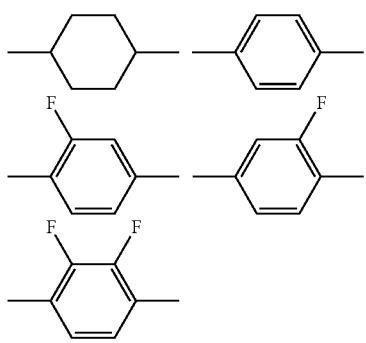

(in the structures, one or more CH$_2$ groups of the cyclohexane ring may be substituted with an oxygen atom, one or more CH groups of the benzene ring may be substituted with a nitrogen atom, and further, one or more hydrogen atoms in the structures may be substituted with Cl, CF$_3$ or OCF$_3$), Z$_1$ to Z$_4$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, Z$_5$ represents a CH$_2$ group or an oxygen atom, at least one of the Z$_1$ and Z$_2$ present is not a single bond, and l$_1$ represents 0 or 1, m$_1$ and m$_2$ each independently represent 0 to 3, and m$_1$+m$_2$ is 1, 2, or 3).

R$_1$ and R$_2$ are each independently preferably an alkyl group having 1 to 7 carbon atoms, an alkoxyl group having 1 to 7 carbon atoms, or an alkenyl group having 2 to 7 carbon atoms.

A$_1$ and A$_2$ are each independently preferably the following structures:

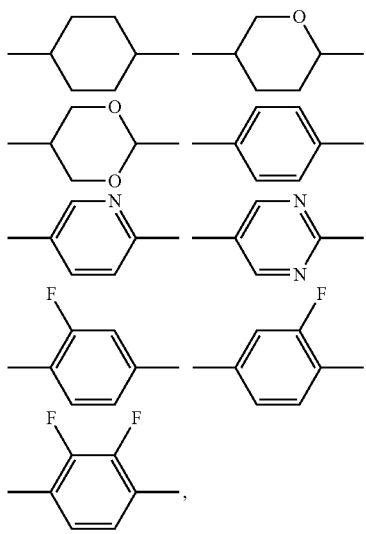

and

Z$_1$ to Z$_4$ are each independently preferably a single bond, —CH$_2$CH$_2$—, —COO—, —OCH$_2$—, —CH$_2$O—, —OCF$_2$—, or —CF$_2$O—.

The liquid crystal composition is more preferably a liquid crystal composition including at least one compound represented by the general formula (LC5):

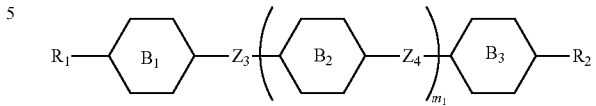

(wherein R$_1$ and R$_2$ each independently represent an alkyl group having 1 to 15 carbon atoms, in which one or two or more CH$_2$ groups in the alkyl group may be substituted with —O—, —CH=CH—, —CO—, —OCO—, —COO—, —C≡C—, —CF$_2$O—, or —OCF$_2$— such that oxygen atoms are not directly adjacent to each other, one or two or more hydrogen atoms in the alkyl group may be arbitrarily substituted with halogen, and B$_1$ to B$_3$ each independently represent any one of the following structures:

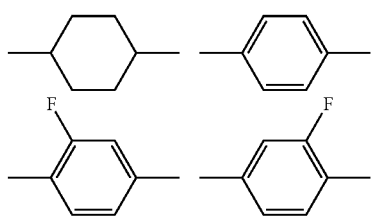

(in the formulae, one or more CH$_2$CH$_2$ groups of the cyclohexane ring may be substituted with —CH=CH—, —CF$_2$O—, or —OCF$_2$—, and one or more CH groups of the benzene ring may be substituted with a nitrogen atom), Z$_3$ and Z$_4$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, at least one of the Z$_1$ and Z$_2$ is not a single bond, and m$_1$ represents 0 to 3).

R$_1$ and R$_2$ each independently preferably an alkyl group having 1 to 7 carbon atoms, an alkoxyl group having 1 to 7 carbon atoms, an alkenyl group having 2 to 7 carbon atoms, and B$_1$ to B$_3$ each independently preferably represent the following structures:

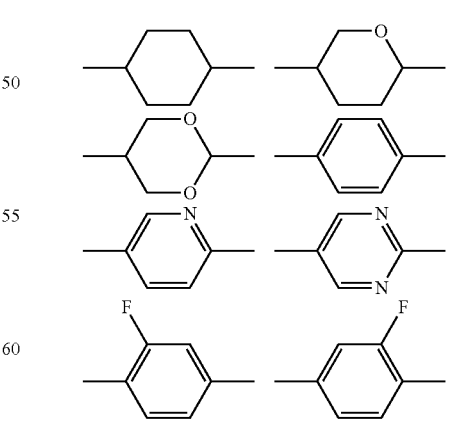

and

Z$_3$ and Z$_4$ are each independently preferably a single bond, —CH$_2$CH$_2$—, —COO—, —OCH$_2$—, —CH$_2$O—, —OCF$_2$—, or —CF$_2$O—.

The general formula (LC1) is more preferably at least one compound selected from the group consisting of the compounds represented by the following general formulae (LC1-1) through (LC1-7):

[Chem. 22]

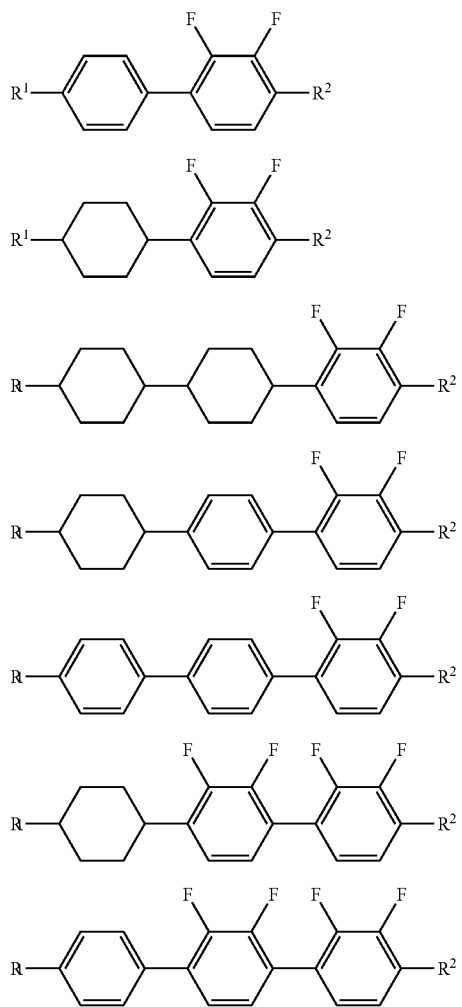

(wherein $R^1$ and $R^2$ each independently represent an alkyl group having 1 to 7 carbon atoms, an alkoxyl group having 1 to 7 carbon atoms, an alkenyl group having 2 to 7 carbon atoms, and an alkenyloxy group having 2 to 7 carbon atoms).

The general formula (LC2) is at least one compound selected from the group consisting of the compounds represented by the following general formulae (LC2)-1 through (LC2)-13, and the following general formulae (LC2-14) through (LC2-15):

[Chem. 23]

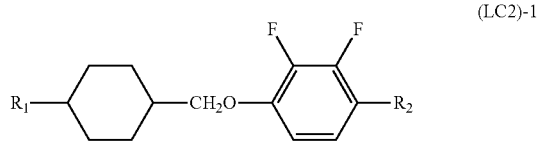

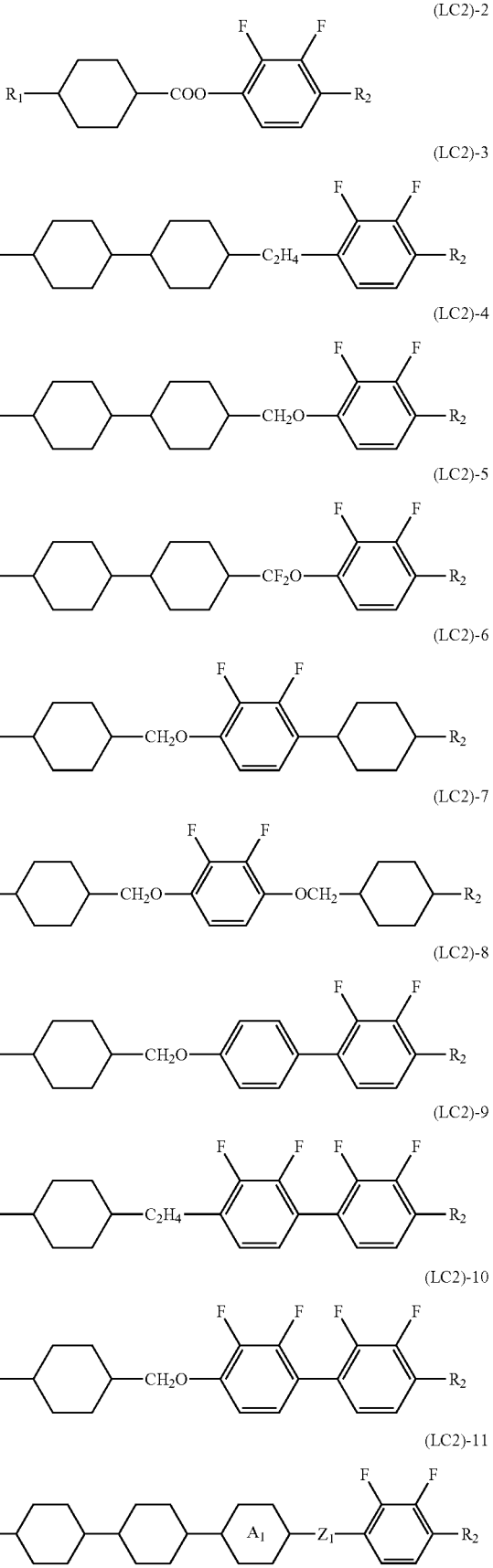

(LC2)-12
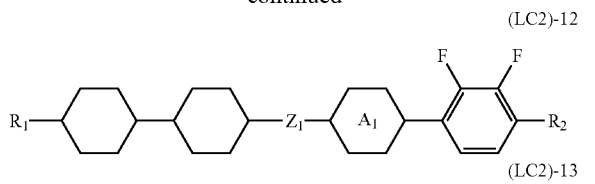

(LC2)-13
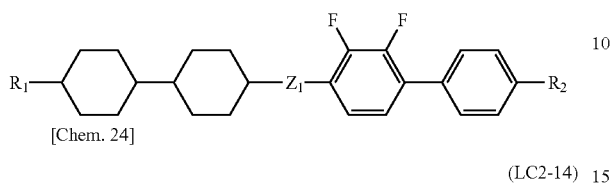

[Chem. 24]

(LC2-14)
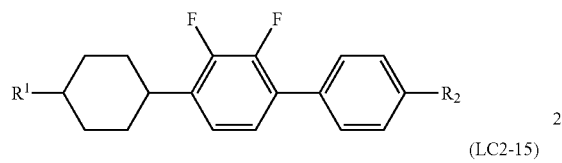

(LC2-15)
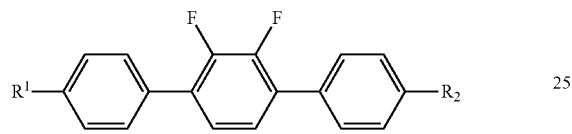

(wherein R¹ and R² each independently represent an alkyl group having 1 to 7 carbon atoms, an alkoxyl group having 1 to 7 carbon atoms, an alkenyl group having 2 to 7 carbon atoms, or an alkenyloxy group having 2 to 7 carbon atoms, $Z_1$ represents —CH$_2$CH$_2$—, —OCH$_2$—, —CH$_2$O—, —OCF$_2$—, or —CF$_2$O—, and $A_1$ represents either one of the following structures:

[Chem. 25]
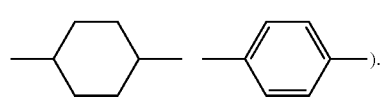

The general formula (LC3) is more preferably at least one compound selected from the group consisting of the compounds represented by the following general formulae (LC3)-1 through (LC3)-6, and the general formula (LC4) is more preferably at least one compound selected from the group consisting of the compounds represented by the following general formulae (LC4)-1 through (LC4)-4:

[Chem. 26]

(LC3)-1
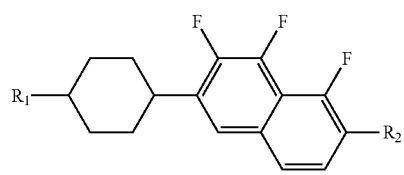

(LC3)-2
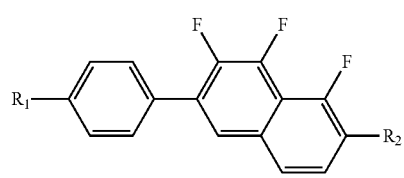

(LC3)-3
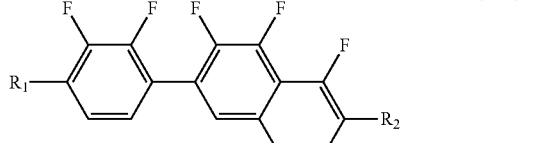

(LC3)-4
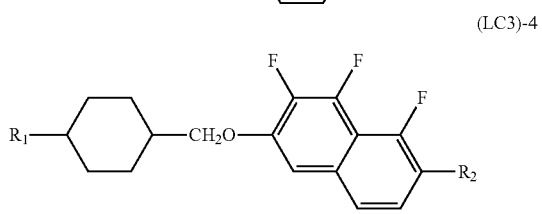

(LC3)-5
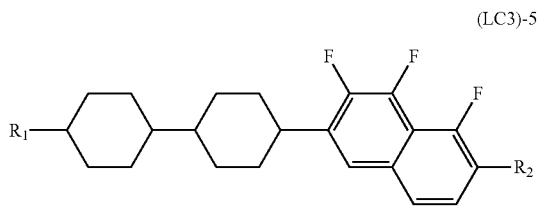

(LC3)-6
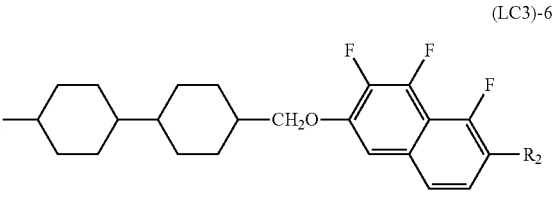

(LC4)-1
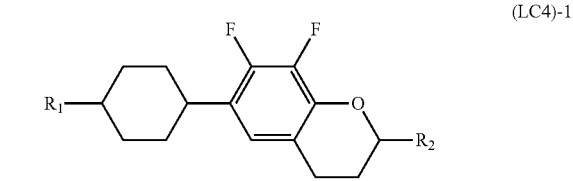

(LC4)-2
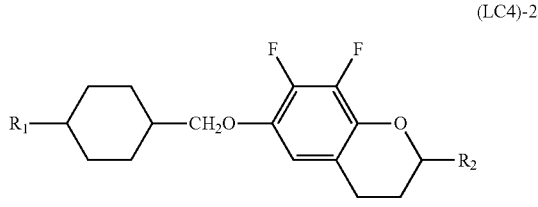

(LC4)-3
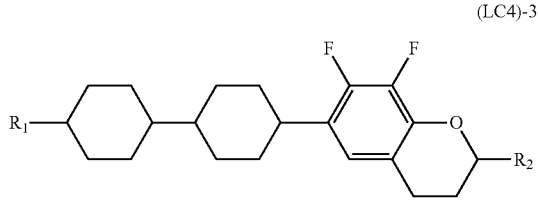

(LC4)-4
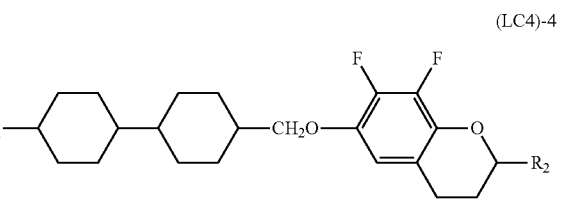

(wherein R¹ and R² each independently represent an alkyl group having 1 to 7 carbon atoms, an alkoxyl group having 1 to 7 carbon atoms, an alkenyl group having 2 to 7 carbon atoms, or an alkenyloxy group having 2 to 7 carbon atoms).

In the case where the liquid crystal display element of the present embodiment is of a horizontal alignment type, such as a TN mode, an STN mode, and an IPS mode, the host composition constituting the liquid crystal composition layer 5 is preferably a "p type" having positive dielectric anisotropy.

As such a host composition, a cyanobenzene-based liquid crystal compound, a difluorobenzene-based liquid crystal compound, a trifluorobenzene-based liquid crystal compound, a trifluoromethylbenzene-based liquid crystal compound, a trifluoromethoxybenzene-based liquid crystal compound, a pyrimidine-based liquid crystal compound, a naphthalene-based liquid crystal compound, a biphenyl-based liquid crystal compound, a phenylcyclohexane-based liquid crystal compound, or the like is used.

As such a compound, specifically, a compound represented by the general formula (IIIa) or (IIIb), having a relatively high Δε, is preferably contained.

[Chem. 27]

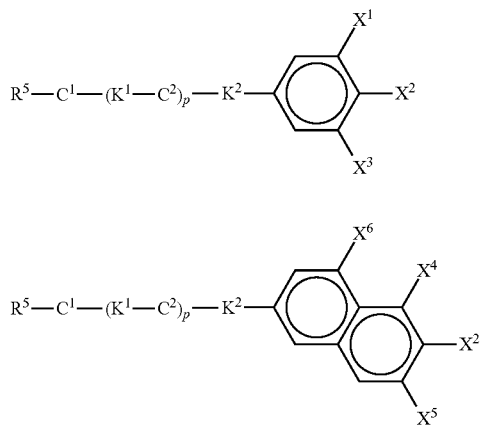

(wherein $R^5$ represents the same meaning as $R^1$ in the general formula (I), and $C^1$ and $C^2$ each independently represent (d) a trans-1,4-cyclohexylene group, (e) a 1,4-phenylene group, or (f) a group selected from the group consisting of a 1,4-cyclohexenylene group, a 1,4-bicyclo(2.2.2)octylene group, a piperidine-1,4-diyl group, a naphthalene-2,6-diyl group, a 1,2,3,4-tetrahydronaphthalene-2,6-diyl group, and a decahydronaphthalene-2,6-diyl group.

In the above (d), one methylene group present or two or more methylene groups not adjacent to each other in the above groups may be substituted with —O— or —S—.

In the above (e), one —CH= present or two or more —CH= not adjacent to each other in the above groups may be substituted with a nitrogen atom.

The groups in the above (d), (e), and (f) may be each substituted with a cyano group, a fluorine atom, or a chlorine atom.

$K^1$ and $K^2$ each independently represent a single bond, —CH$_2$CH$_2$—, —(CH$_2$)$_4$—, —OCH$_2$—, —CH$_2$O—, —OCF$_2$—, —CF$_2$O—, —OCO—, —COO—, or —C≡C—.

$X^1$, $X^3$, $X^4$, $X^5$, and $X^6$ each independently represent a hydrogen atom or a fluorine atom.

$X^2$ represents a hydrogen atom, a fluorine atom, a chlorine atom, a cyano group, a trifluoromethyl group, a fluoromethoxy group, a difluoromethoxy group, a trifluoromethoxy group, a 2,2,2-trifluoroethyl group, or the same meaning as $R^1$. p represents 0, 1, or 2.)

In the general formulae (IIIa) and (IIIb), $R^5$ preferably represents a linear alkyl group having 1 to 15 carbon atoms or an alkenyl group having 2 to 15 carbon atoms, more preferably a linear alkyl group having 1 to 10 carbon atoms or an alkenyl group having 2 to 10 carbon atoms, and particularly preferably a linear alkyl group having 1 to 8 carbon atoms or an alkenyl group having 2 to 6 carbon atoms, and the alkenyl group most preferably represents the following structures:

[Chem. 28]

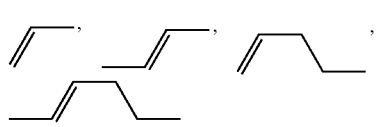

(wherein the group is linked to C' at the right end).

$K^1$ and $K^2$ preferably represent —COO—, —OCO—, —CH$_2$CH$_2$—, —CH=CH—, —C≡C—, —(CH$_2$)$_4$—, or a single bond, more preferably —CH$_2$CH$_2$—, —C≡C—, or a single bond, and particularly preferably —CH$_2$CH$_2$— or a single bond. In the case where a plurality of $K^1$ or $K^2$ are present, at least one thereof preferably represents a single bond.

p preferably represents 0 or 1.

In the general formulae (IIIa) and (IIIb), $C^1$ and $C^2$ each independently preferably represent a trans-1,4-cyclohexylene group, a 1,4-phenylene group, a 3-fluoro-1,4-phenylene group, or a 3,5-difluoro-1,4-phenylene group, more preferably a trans-1,4-cyclohexylene group or a 1,4-phenylene group, and particularly preferably a trans-1,4-cyclohexylene group.

$X^2$ preferably represents a fluorine atom, a cyano group, a trifluoromethyl group, a fluoromethoxy group, a difluoromethoxy group, or a trifluoromethoxy group, and more preferably a fluorine atom.

Out of the general formulae (IIIa) and (IIIb), the general formula (IIIa) is preferred, and specifically, a structure represented by the following general formula (IIIa-1) is more preferred:

[Chem. 29]

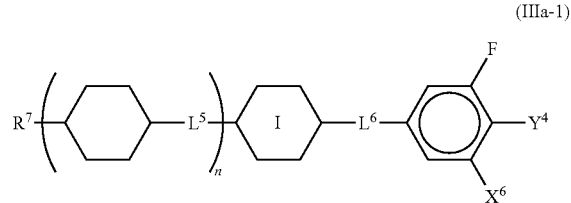

(wherein $R^7$ represents an alkyl group having 1 to 8 carbon atoms, an alkoxyl group having 1 to 8 carbon atoms, or an alkenyl group having 2 to 8 carbon atoms, $L^5$ and $L^6$ each independently represent —CH$_2$CH$_2$—, —CH=CH—, —(CH$_2$)$_4$—, or a single bond, I represents a 1,4-phenylene group or a trans-1,4-cyclohexylene group, $X^6$ represents a hydrogen atom or a fluorine atom, n represents 0 or 1, and $Y^4$ represents a cyano group, a fluorine atom, a chlorine atom, a trifluoromethyl group, a fluoromethoxy group, a difluoromethoxy group, or a trifluoromethoxy group).

More specifically, the structures represented by the following general formulae (IIIa-2a) to (IIIa-4s) are preferred:

[Chem. 30]
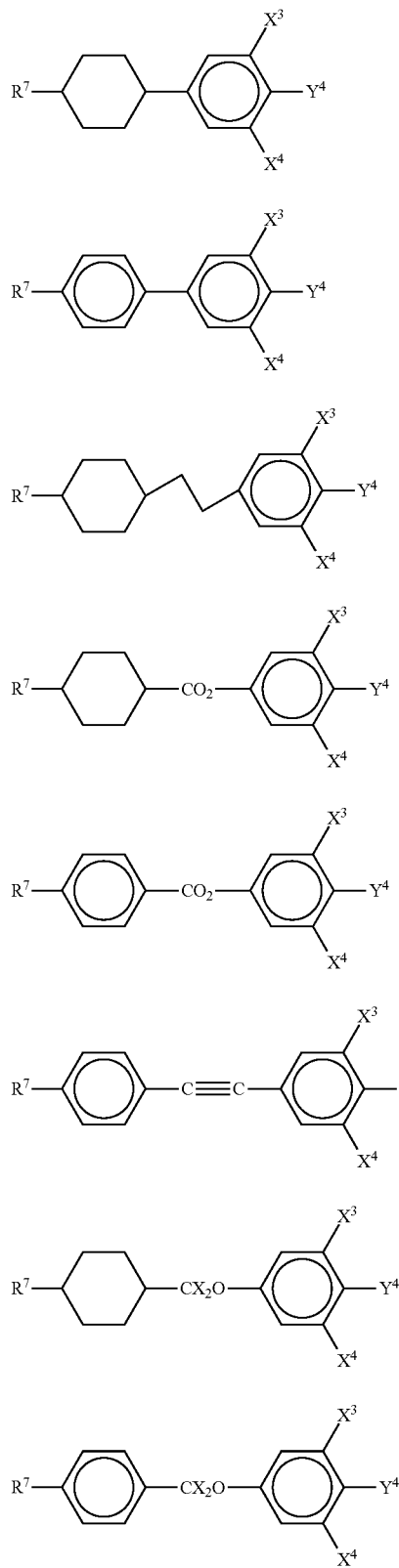
(IIIa-2a)
(IIIa-2b)
(IIIa-2c)
(IIIa-2d)
(IIIa-2e)
(IIIa-2f)
(IIIa-2g)
(IIIa-2h)
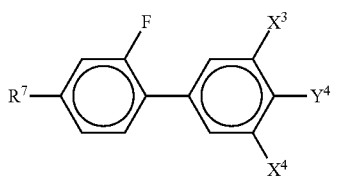
(IIIa-2i)
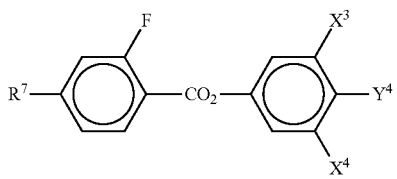
(IIIa-2j)
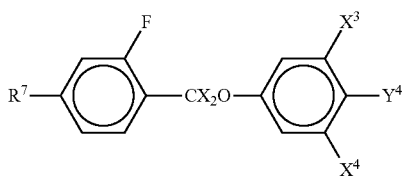
(IIIa-2k)
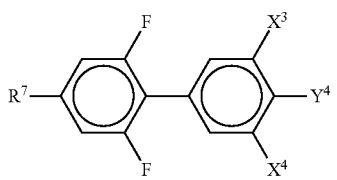
(IIIa-2l)
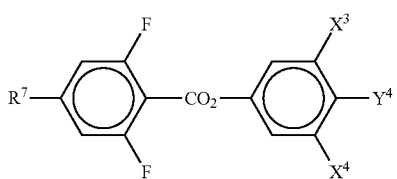
(IIIa-2m)
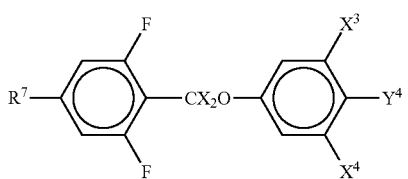
(IIIa-2n)
[Chem. 31]
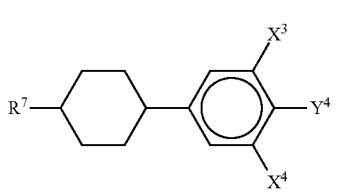
(IIIa-2a)
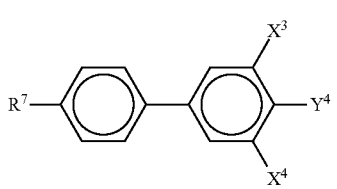
(IIIa-2b)

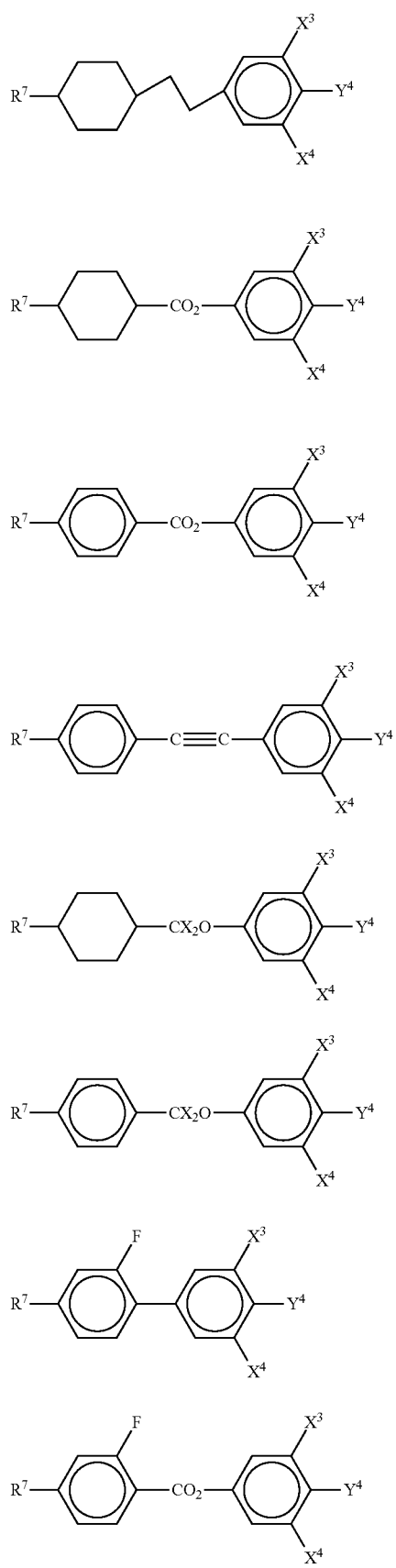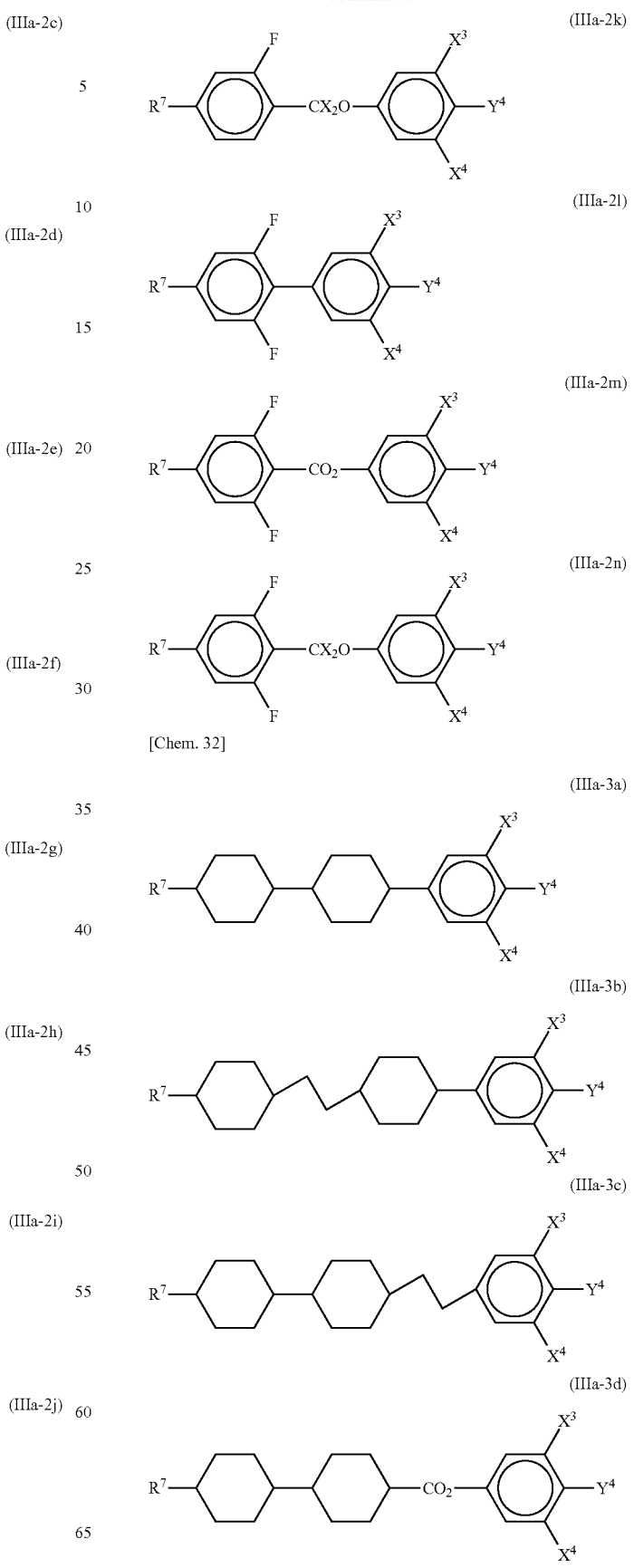

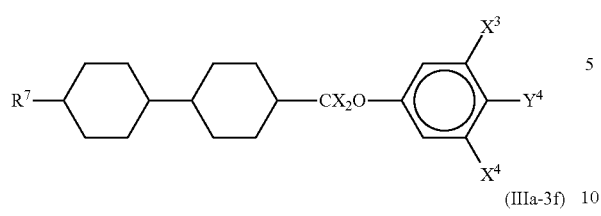
(IIIa-3e)
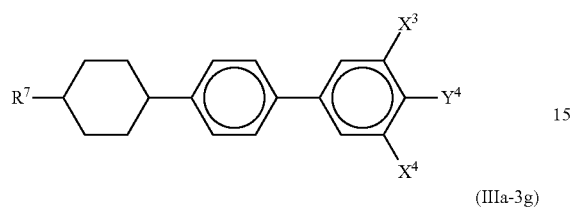
(IIIa-3f)
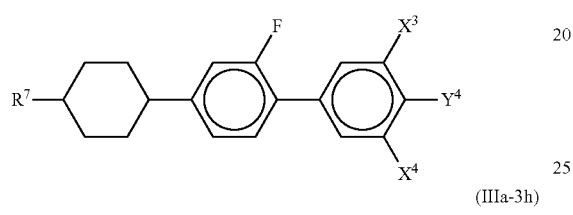
(IIIa-3g)
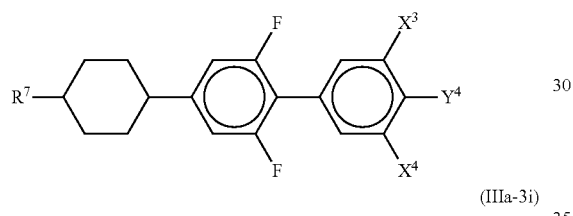
(IIIa-3h)
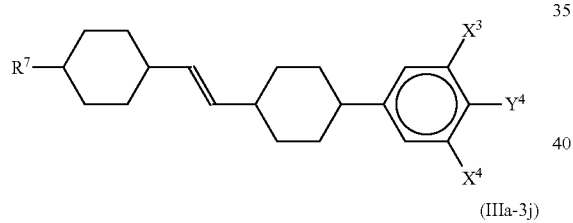
(IIIa-3i)
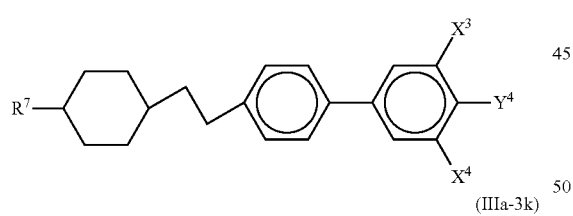
(IIIa-3j)
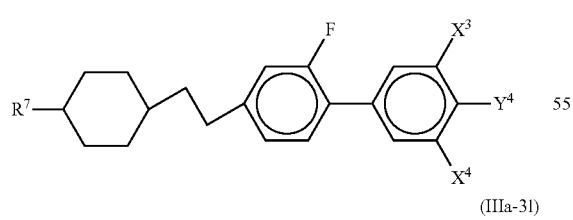
(IIIa-3k)
[Chem. 33]
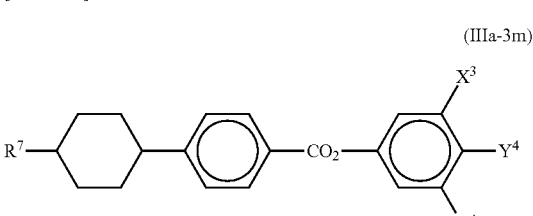
(IIIa-3m)
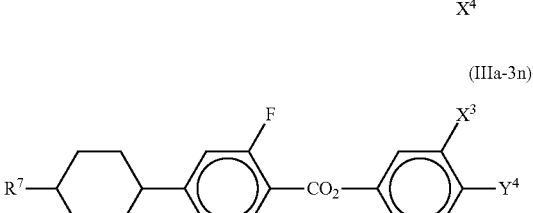
(IIIa-3n)
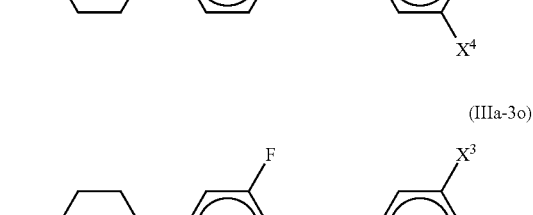
(IIIa-3o)
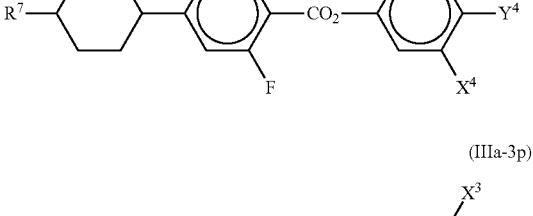
(IIIa-3p)
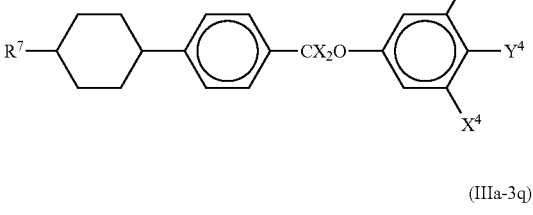
(IIIa-3q)
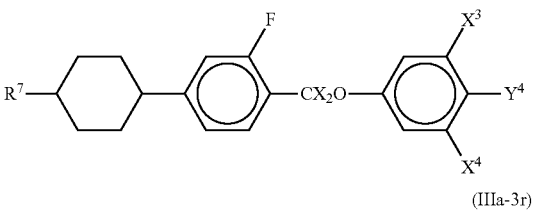
(IIIa-3r)
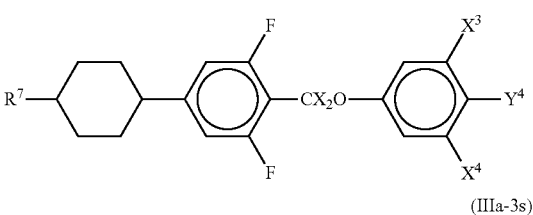
(IIIa-3s)
(IIIa-3l)

(IIIa-3t)
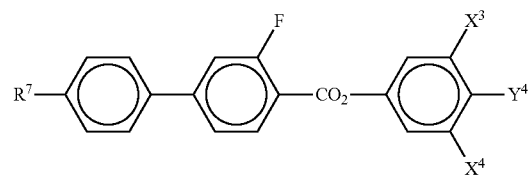
(IIIa-3u)
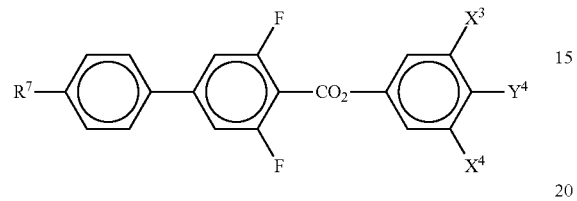
(IIIa-3v)
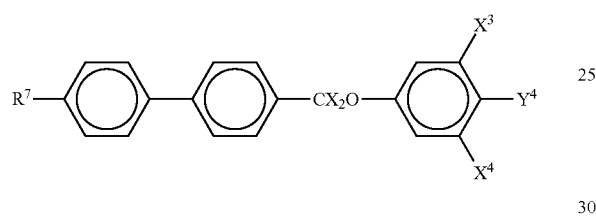
(IIIa-3w)
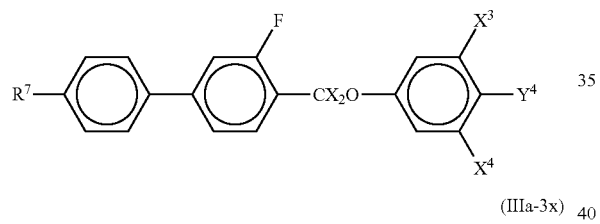
(IIIa-3x)
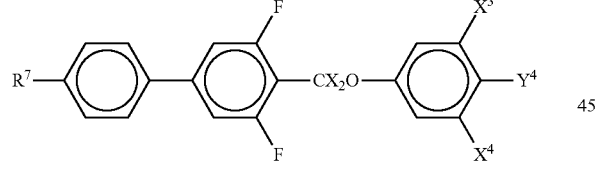
[Chem. 34]
(IIIa-3s)
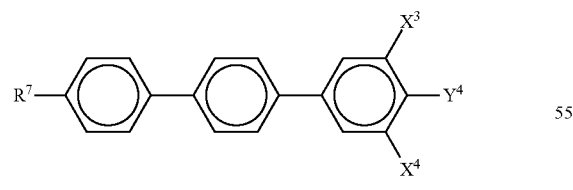
(IIIa-3t)
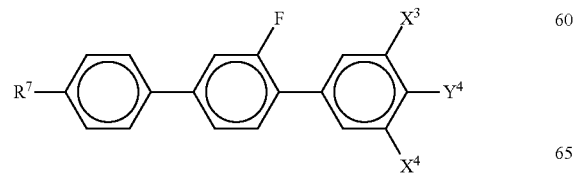
(IIIa-3u)
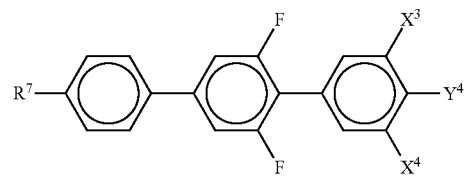
(IIIa-3v)
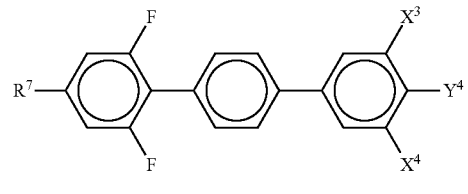
(IIIa-3w)
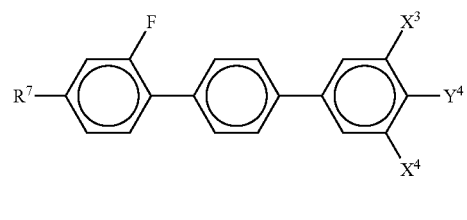
(IIIa-3x)
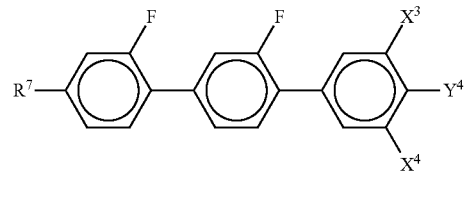
(IIIa-3y)
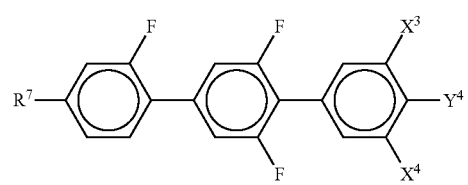
(IIIa-3z)
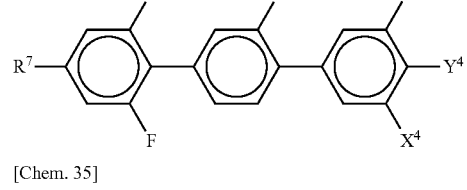
[Chem. 35]
(IIIa-4a)
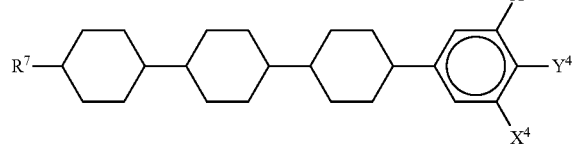

(IIIa-4b) 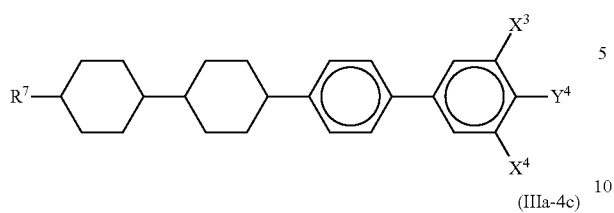
(IIIa-4c) 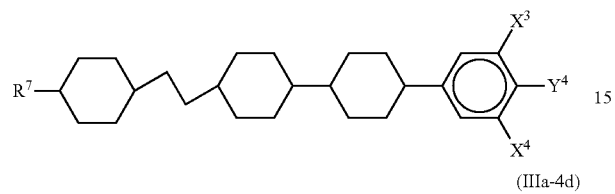
(IIIa-4d) 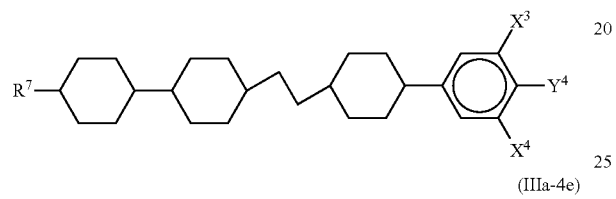
(IIIa-4e) 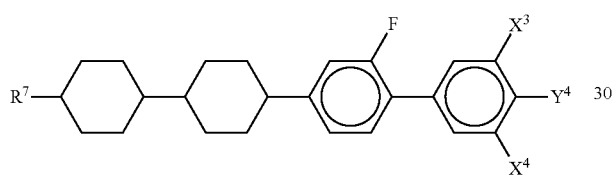
(IIIa-4f) 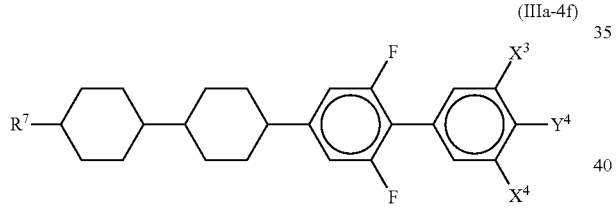
(IIIa-4g) 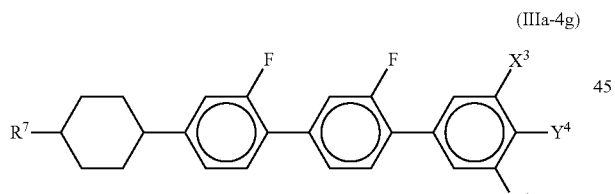
(IIIa-4h) 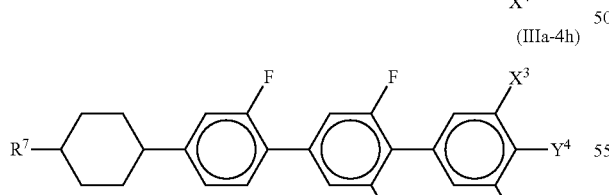
(IIIa-4i) 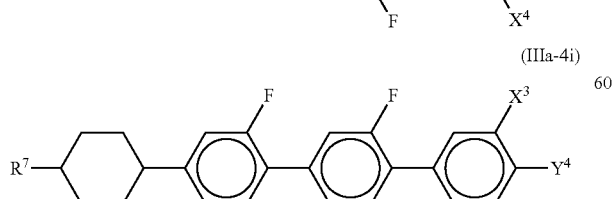
[Chem. 36]
(IIIa-4j) 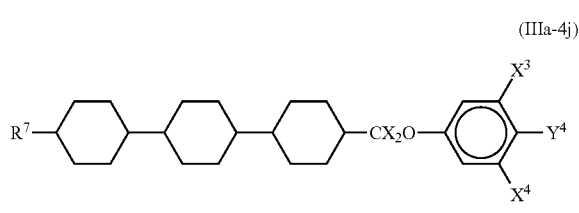
(IIIa-4k) 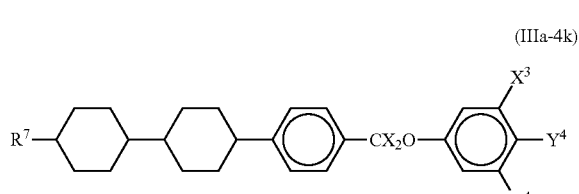
(IIIa-4l) 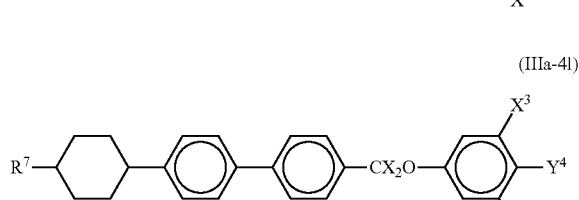
(IIIa-4m) 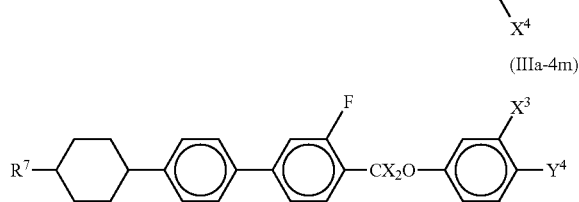
(IIIa-4n) 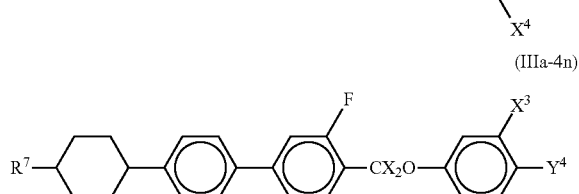
(IIIa-4o) 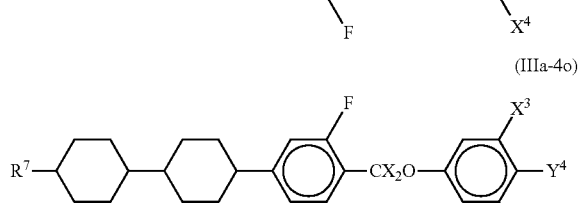
(IIIa-4p) 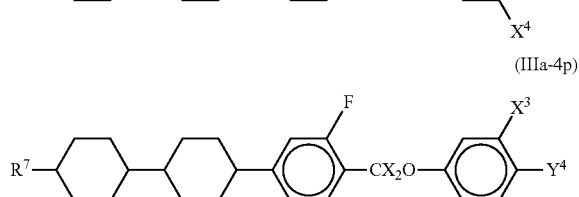
(IIIa-4q) 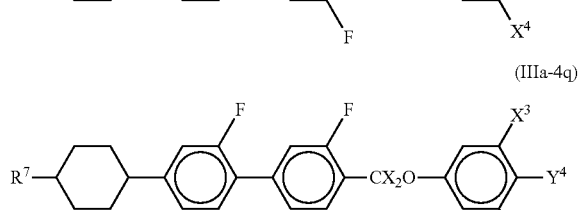

-continued

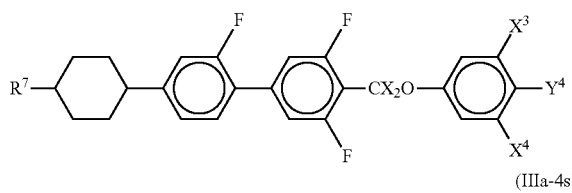
(IIIa-4r)

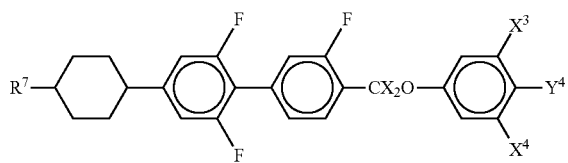
(IIIa-4s)

(wherein R$^7$ represents an alkyl group having 1 to 8 carbon atoms, an alkoxyl group having 1 to 8 carbon atoms, or an alkenyl group having 2 to 8 carbon atoms, X$^3$ and X$^4$ each independently represent a hydrogen atom or a fluorine atom, Y$^4$ represents a cyano group, a fluorine atom, a chlorine atom, a trifluoromethyl group, a fluoromethoxy group, a difluoromethoxy group, or a trifluoromethoxy group, and X represents a hydrogen atom or a fluorine atom), and the compounds represented by the following general formulae are also preferred:

[Chem. 37]

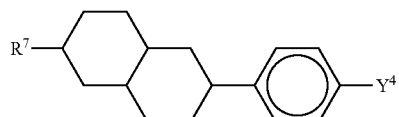
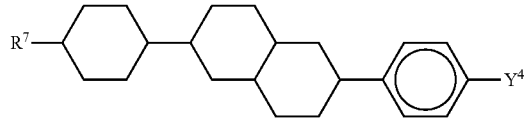
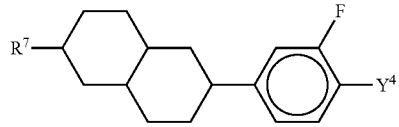
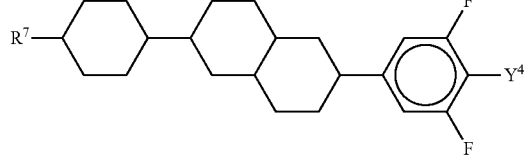

(wherein R$^7$ represents an alkyl group having 1 to 8 carbon atoms, an alkoxyl group having 1 to 8 carbon atoms or an alkenyl group having 2 to 8 carbon atoms, X$^3$ and X$^4$ each independently represent a hydrogen atom or a fluorine atom, Y$^4$ represents a cyano group, a fluorine atom, a chlorine atom, a trifluoromethyl group, a fluoromethoxy group, a difluoromethoxy group, or a trifluoromethoxy group).

As for the general formula (IIIb), the specific structures are preferably the compounds represented by the following general formulae:

[Chem. 38]

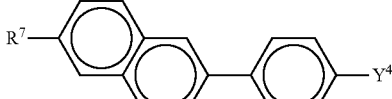
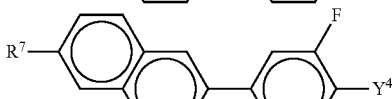
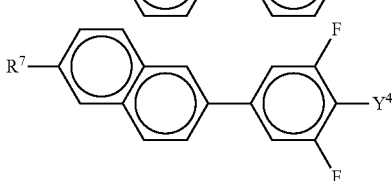
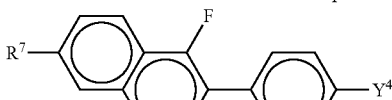
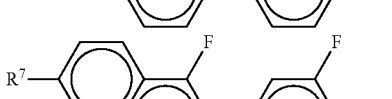
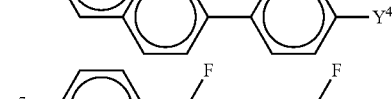
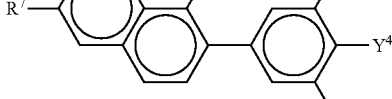
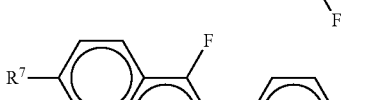
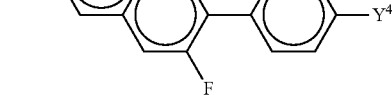
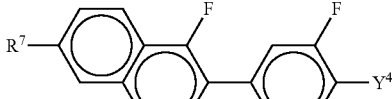
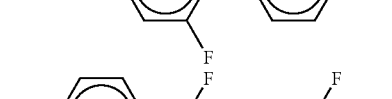
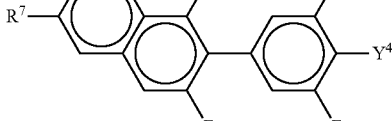
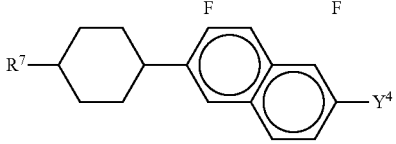

-continued
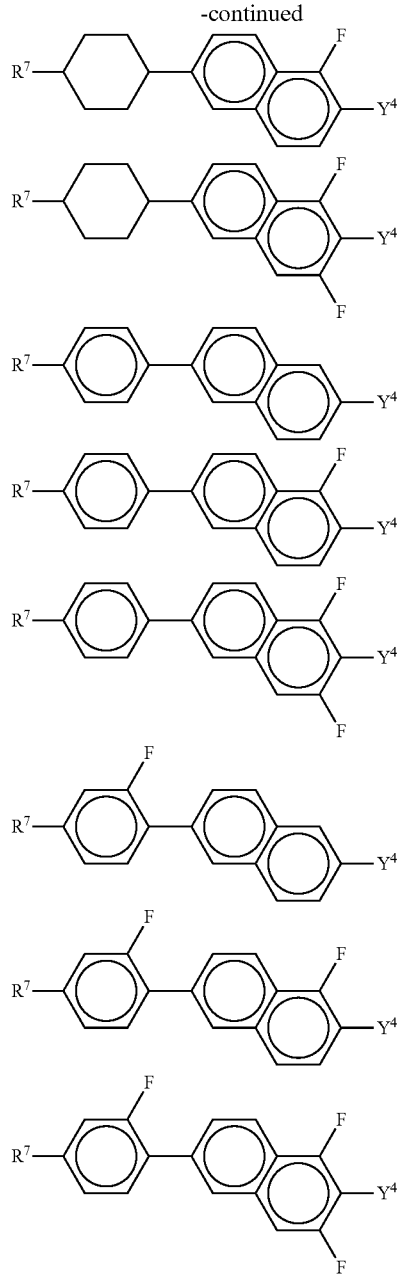
[Chem. 39]
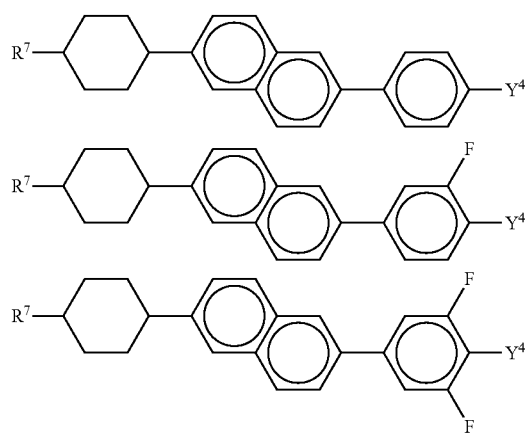
-continued
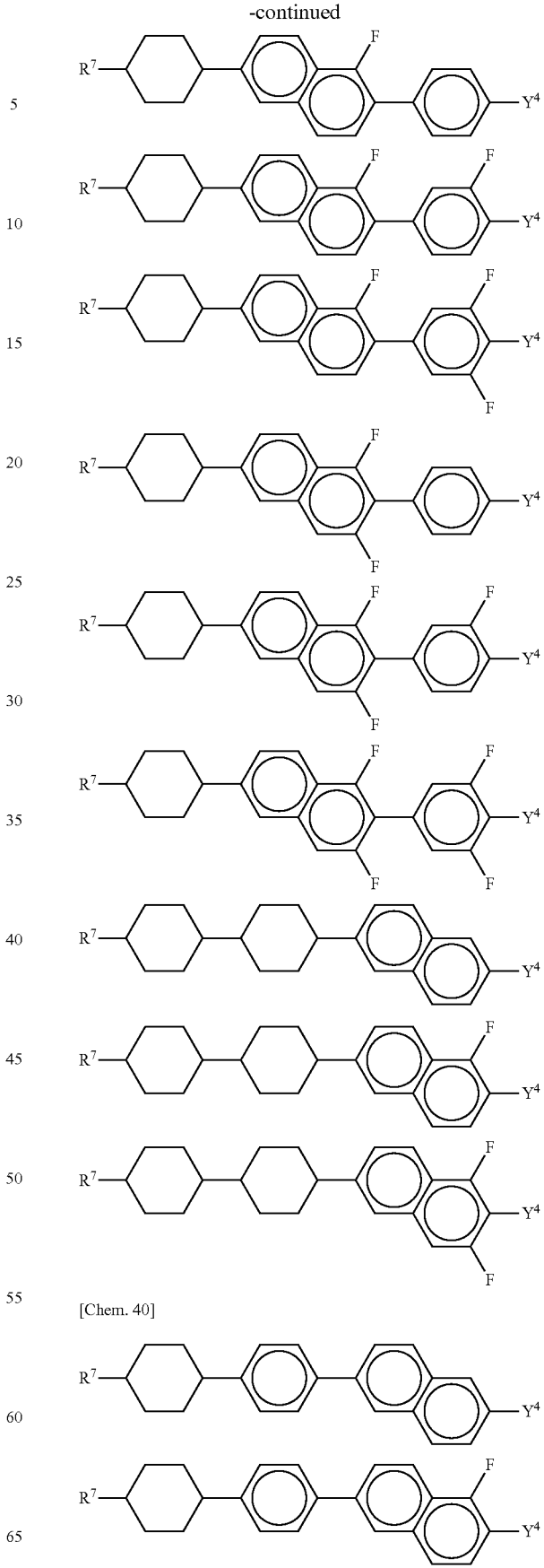
[Chem. 40]

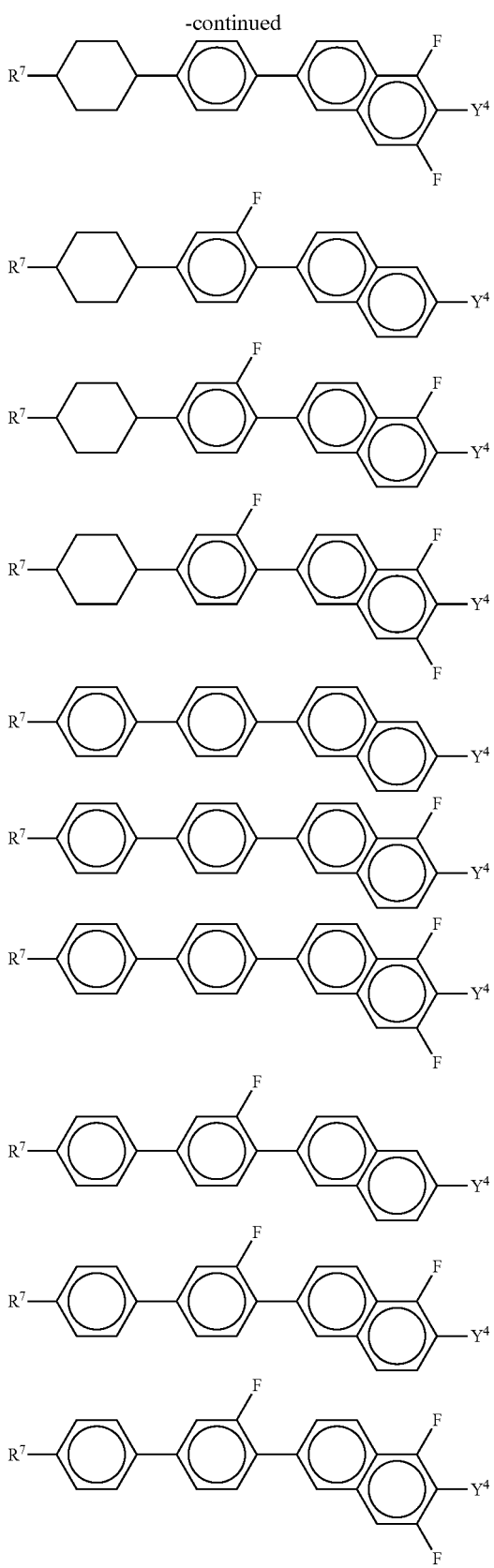

(wherein R[7] represents an alkyl group having 1 to 8 carbon atoms, an alkoxyl group having 1 to 8 carbon atoms or an alkenyl group having 2 to 8 carbon atoms, and Y[4] represents a cyano group, a fluorine atom, a chlorine atom, a trifluoromethyl group, a fluoromethoxy group, a difluoromethoxy group, or a trifluoromethoxy group).

Moreover, as the liquid crystal display element of the present embodiment, a "non-polar type" one having neutral dielectric anisotropy may be used as the liquid crystal composition constituting the liquid crystal composition layer 5.

The compound is specifically preferably a compound represented by the general formula (II), having a small absolute value of Δε:

[Chem. 41]

(wherein R[3] and R[4] each independently represent the same as R[1] in the general formula (I), and B[1], B[2] and B[3] each independently represent:

(a) a trans-1,4-cyclohexylene group (one methylene group present or two or more methylene groups not adjacent to each other in this group may be substituted with —O— or —S—), (b) a 1,4-phenylene group (one —CH= present or two or more —CH= not adjacent to each other in this group may be substituted with a nitrogen atom), or (c) a group selected from the group consisting of a 1,4-cyclohexenylene group, a 1,4-bicyclo(2.2.2)octylene group, a piperidine-1,4-diyl group, a naphthalene-2,6-diyl group, a decahydronaphthalene-2,6-diyl group, and a 1,2,3,4-tetrahydronaphthalene-2,6-diyl group.

The groups in the (a), (b), and (c) may be each substituted with a cyano group, a fluorine atom, or a chlorine atom.

o represents 0, 1 or 2,

L[1], L[2] and L[3] each independently represent a single bond, —CH$_2$CH$_2$—, —(CH$_2$)$_4$(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—, and in the case where a plurality of L[2] and B[3] are present, they may be the same as or different from each other).

In the general formula (II), R[3] and R[4] preferably represent an unsubstituted linear alkyl group having 1 to 15 carbon atoms or alkenyl group having 2 to 15 carbon atoms, more preferably an unsubstituted linear alkyl group having 1 to 10 carbon atoms or alkenyl group having 2 to 10 carbon atoms, and particularly preferably an unsubstituted linear alkyl group having 1 to 8 carbon atoms or alkenyl group having 2 to 6 carbon atoms, and the alkenyl group most preferably represents the following structures:

[Chem. 42]

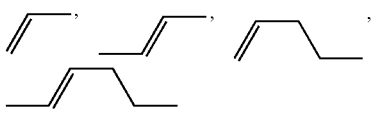

(wherein for R[3], the group is linked to B[1] at the left end, and for R[4], the group is linked to B[2] or B[3] at the left end).

Furthermore, R[3] and R[4] may be the same as or different from each other, but R[3] and R[4] in the same molecule are more preferably different from each other.

L[1] and L[2] preferably represent —COO—, —OCO—, —CH$_2$CH$_2$—, —CH=CH—, —C≡C—, —(CH$_2$)$_4$—, or a single bond, more preferably —CH$_2$CH$_2$—, —CH=CH—, —C≡C—, or a single bond, and particularly preferably —CH$_2$CH$_2$— or a single bond. In the case where a plurality of L$^1$ or L$^2$ are present, at least one thereof preferably represents a single bond.

o preferably represents 0 or 1.

B$^1$, B$^2$, and B$^3$ each independently preferably represent a trans-1,4-cyclohexylene group, a 1,4-phenylene group, a 3-fluoro-1,4-phenylene group, or a 3,5-difluoro-1,4-phenylene group, more preferably a trans-1,4-cyclohexylene group or a 1,4-phenylene group, and at least one of B$^1$, B$^2$ and B$^3$ preferably represent a trans-1,4-cyclohexylene group.

As for the general formula (II), the specific structures are preferably the compounds represented by the following general formulae (IIa) through (IIg):

[Chem. 43]

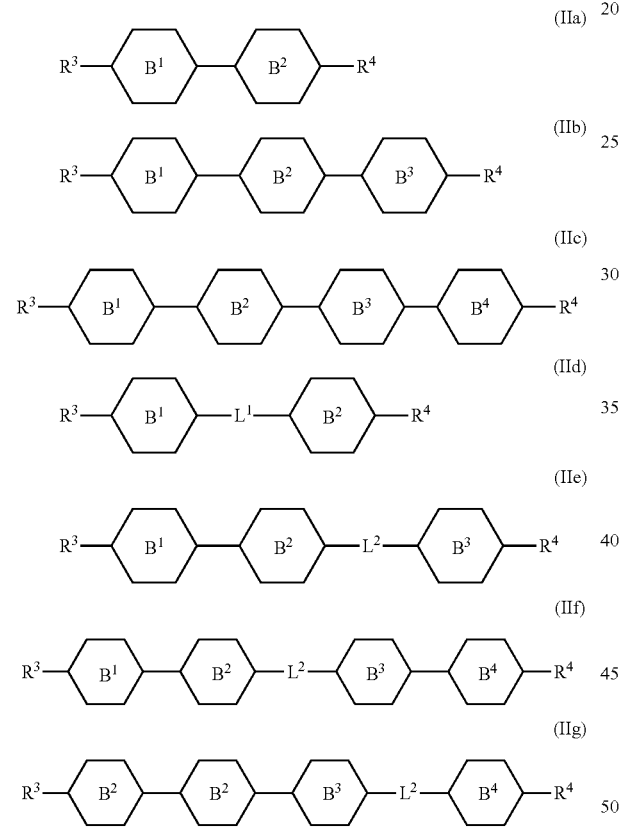

(wherein R$^3$ and R$^4$ each independently represent an alkyl or alkoxyl group having 1 to 8 carbon atoms, an alkenyl group having 2 to 8 carbon atoms, or an alkenyloxy group having 3 to 8 carbon atoms, B$^1$, B$^2$, B$^3$, and B$^4$ each independently represent a 1,4-phenylene group or a trans-1,4-cyclohexylene group, in which the 1,4-phenylene group may be each independently substituted with a fluorine atom, and L$^1$ and L$^2$ each independently represent —CH$_2$CH$_2$—, —CH=CH—, —C≡C—, or a single bond).

As for the general formulae (IIa) and (IId), the more specific structures are preferably the compounds represented by the following general formulae (IIa-1) through (IId-3):

[Chem. 44]

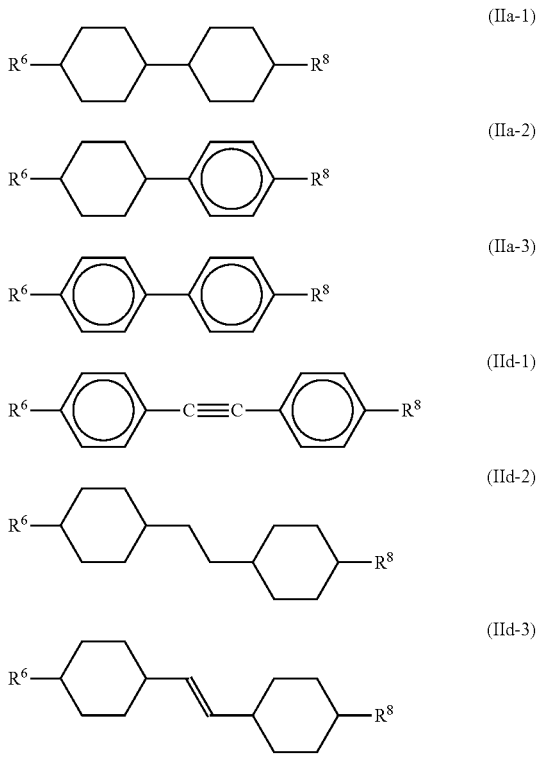

(wherein R$^6$ and R$^8$ each independently represent an alkyl or alkoxyl group having 1 to 8 carbon atoms, an alkenyl group having 2 to 8 carbon atoms, or an alkenyloxy group having 3 to 8 carbon atoms).

As for the general formula (IIb), the more specific structures are preferably the compounds represented by the following general formulae (IIb-1) through (IIb-6):

[Chem. 45]

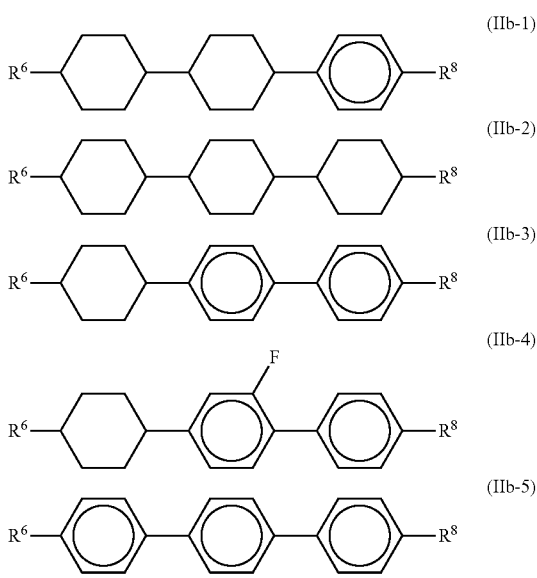

(IIb-6)

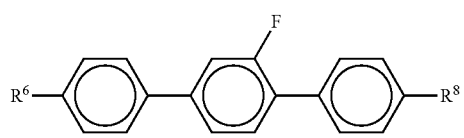

(wherein $R^6$ and $R^8$ each independently represent an alkyl or alkoxyl group having 1 to 8 carbon atoms, an alkenyl group having 2 to 8 carbon atoms, or an alkenyloxy group having 3 to 16 carbon atoms).

As for the general formula (IIe), the more specific structures are preferably the compounds represented by the following general formulae (IIe-1) through (IIe-3):

[Chem. 46]

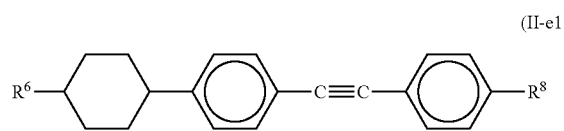
(II-e1)

[Chem. 48]

-continued
(II-e2)

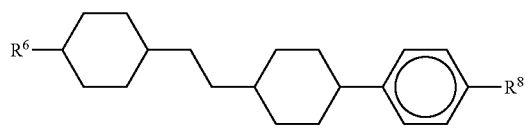

(II-e3)

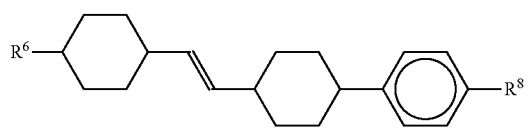

(wherein $R^6$ and $R^8$ each independently represent an alkyl or alkoxyl group having 1 to 8 carbon atoms, an alkenyl group having 2 to 8 carbon atoms, or an alkenyloxy group having 3 to 16 carbon atoms).

In the case where the liquid crystal composition used in the present invention contains a compound selected from the general formula (II), 1 to 6 kinds of the compound are preferably contained, and 1 to 4 kinds of the compound are more preferably contained.

The content of the compound represented by the general formula (II) in the liquid crystal composition used in the present invention is preferably in the range of 10 to 80% by mass, and more preferably in the range of 10 to 60% by mass.

In the case where $R^3$, $R^4$, $R^6$ and $R^8$ represent alkenyl groups, the structures represented by the following formulae are preferred:

[Chem. 47]

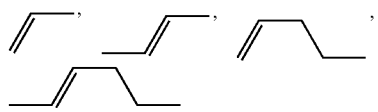

(wherein the groups are linked to the ring structures at the right terminals (ring ends)).

Among these, a vinyl group and a 3-butenyl group are more preferred, and a vinyl group is particularly preferred.

EXAMPLES

Hereinbelow, the present invention will be described in more detail referring to Examples, but the present invention is not limited thereto.

(Production of Liquid Crystal Compound)

According to the production method described in Japanese Unexamined Patent Application, First Publication No. 2009-249406, the production of the following compound 1 was carried out.

Compound 1

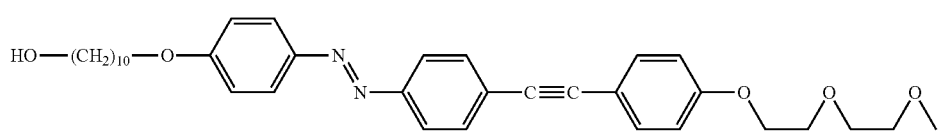

(Measurement of Elastic Constant)

Figure 3:
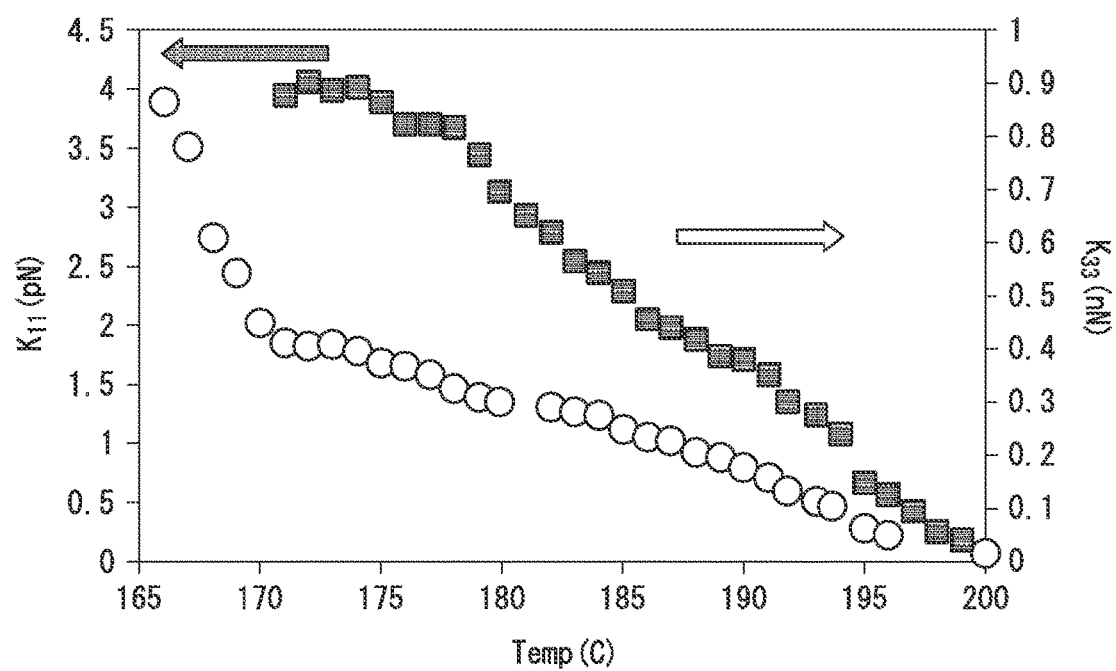
FIG. 3 is a view showing the measurement results of $K_{33}$ (bend elastic constant) and $K_{11}$ (spray elastic constant) of the liquid crystal display element according to the present embodiment.

The elastic constant ($K_{33}$, $K_{11}$) of the compound 1 was measured using a capacitance method. The compound 1 in the nematic phase was injected into a cell that had been subjected to a horizontal alignment treatment, and the dependency of the capacitance on the applied voltage was measured. $K_{11}$ was calculated from the Freedericksz transition and the dielectric anisotropy, a value of $K_{33}/K_{11}$ was determined by curve fitting, and $K_{33}$ was calculated from these values. The results are shown in FIG. 3. As a result, it was confirmed that the compound 1 exhibited an extremely high value of $K_{33}$ of 890 pN at T'. In addition, it was confirmed that a cybotactic cluster was produced in the nematic liquid crystal of the compound 1 in that the diffraction peak was expressed in the small angle region of the X-ray diffraction.

(Example 1) Preparation of Liquid Crystal Display Element (Preparation of Liquid Crystal Composition)

2.6% by mass and 7.6% by mass of the compounds 1 were added, respectively, to a cyanobiphenyl-based nematic liquid crystal (7CB) represented by the following formula, thereby preparing a nematic liquid crystal composition.

[Chem. 49]

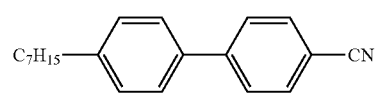

(Measurement of Elastic Constant)

$K_{33}$ of each of the prepared liquid crystal compositions was measured at 36° C., the $K_{33}$ of the composition obtained by adding 2.6% by mass of the compound 1 was 14 pN, and the $K_{33}$ of the composition obtained by adding 7.6% by mass of the compound 1 was 27 pN, thereby obtaining a liquid crystal composition having a high value $K_{33}$ by the addition of such a small amount of the compound 1.

(Preparation of Display Element and Evaluation of Response Time)

A cell (cell thickness of 5.6 microns) that had been treated by horizontal alignment and rubbing such that the liquid crystal molecules were uniaxially aligned was used, and set such that the alignment axis of the liquid crystals were inclined 45° from the polarizing plate of the crossed Nicols and the response time was evaluated at 36° C. First, a voltage of 5 V was applied to attain a dark state. Then, the response time (t 0% to 90%) required for the liquid crystal molecules to return to the initial uniaxial alignment state by turning the voltage off was evaluated by measuring a change in the amount of the light transmitted. The response time of the composition obtained by the addition of 2.6% by mass of the compound 1 was 180 ms, the response time of the composition obtained by the addition of 7.6% by mass of the compound 1 was 80 ms, and it was confirmed that an increase in $K_{33}$ of the composition by the addition of the compound 1 having a high $K_{33}$ is effective to shorten the response time.

Comparative Example 1

$K_{33}$ of the above-described nematic liquid crystal compound 7CB was measured at 36° C. and found to be a low value of 5 pN. A liquid crystal display element was prepared using 7CB as the liquid crystal composition, in the same manner as in Example 1 except that the compound 1 was not added, and its response time was measured by the same method as in the Examples and found that the response was slow and had a value of 300 ms.

In Example 1, in which to the liquid crystal compound 7CB of Comparative Example 1 having a bend elastic constant $K_{33}$ of 5 pN was added 2.6% by weight of the compound 1 (compound having a bend elastic constant $K_{33}$ of 20 pN or more), the bend elastic constant $K_{33}$ of the completed composition was 14 pN, which was less than 20 pN, but it was confirmed that its response became faster than that of the liquid crystal 7CB.

(Example 2) Preparation of Liquid Crystal Display Element (Preparation of Liquid Crystal Composition)

A nematic liquid crystal composition (A-1) having the following composition was prepared.

[Chem. 50]
Nematic Liquid Crystal Composition (A-1)

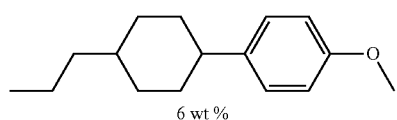

6 wt %

-continued 15 wt %

10 wt %

10 wt %

8 wt %

13 wt %

9 wt %

8 wt %

11 wt %

10 wt %

Next, a nematic liquid crystal composition (A-2) was prepared from 98% by mass of the nematic liquid crystal composition (A-1) and 2% by mass of the compound 1.

(Measurement of Elastic Constant)

The $K_{33}$ of the prepared nematic liquid crystal composition (A-2) at 25° C. was measured with EC-1 manufactured by Toyo Technica Inc. and found to be a high value of 20 pN, and a high value of $K_{33}$ could be obtained by the addition of a small amount of the compound 1.

(Preparation of Display Element and Evaluation of Response Time)

The response speed of the liquid crystal display element obtained using the liquid crystal composition (τd, measured at 4.5 V→1 V) was measured using a test cell (SE-5300 manufactured by Nissan Chemical Industries, Ltd., cell thickness of 3.5 μm) at a measurement temperature of 25° C., was found to be a small value of 5.5 ms. It could be seen that an increase in $K_{33}$ of the composition by the addition of the compound 1 having a high $K_{33}$ is effective to shorten the response time.

Comparative Example 2

$K_{33}$ was measured using the liquid crystal composition (A-1), in the same manner as in Example 2 except that the compound 1 was not added, and found to be 13 pN and the response time was 7.8 ms.

(Example 3) Preparation of Liquid Crystal Display Element (Preparation of Liquid Crystal Composition)
A nematic liquid crystal composition (B-1) having the following composition was prepared.

[Chem. 51]
Nematic Liquid Crystal Composition

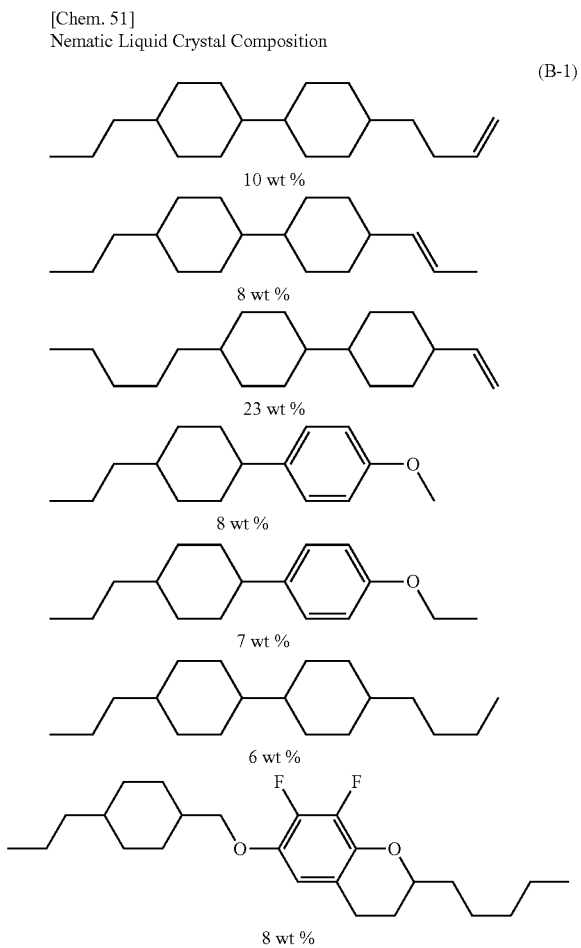

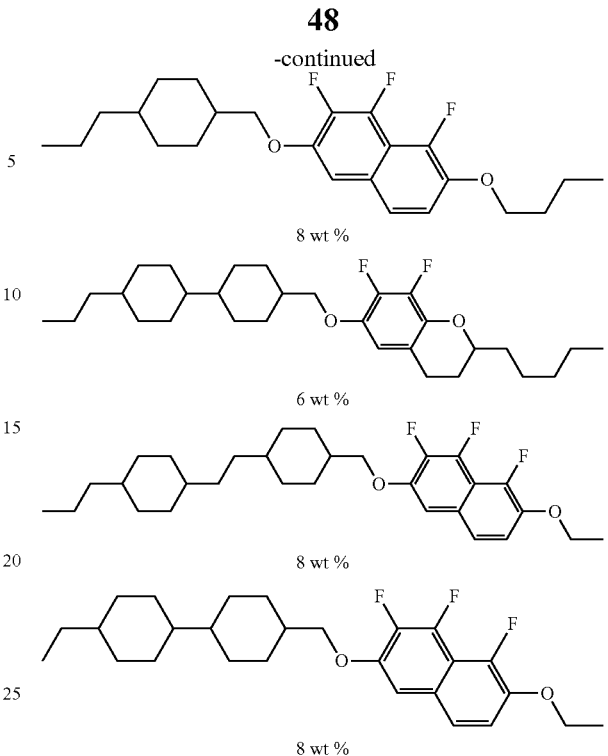

In the same manner as in Example 2 except that the liquid crystal composition (B-2) was used instead of the liquid crystal composition (A-2), $K_{33}$ was measured and found to be 21 pN and the response time was a low value of 5.8 ms.

Comparative Example 3

In the same manner as in Comparative Example 2 except that the Comparative liquid crystal composition (B-1) was used instead of the liquid crystal composition (A-1), $K_{33}$ was measured and found to be 14 pN and the response time was 8.5 ms.

The main physical properties as a liquid crystal of the liquid crystal composition (A-2), the liquid crystal composition (A-1), the liquid crystal composition (B-2), and the liquid crystal composition (B-1) used in Example 2, Comparative Example 2, Example 3, and Comparative Example 3, respectively, are summarized as in Table 1 below, and it can be seen that the $K_{33}$ of the liquid crystal composition can be increased by the addition of the compound 1 having a high bend elastic constant $K_{33}$, and thus, the response time can be shortened while not adversely affecting all the physical properties of the liquid crystal composition.

TABLE 1

| Physical properties as liquid crystal | Example 2 Liquid crystal composition (A-2) | Comparative Example 2 Liquid crystal composition (A-1) | Example 3 Liquid crystal composition (B-2) | Comparative Example 3 Liquid crystal composition (B-1) |
| --- | --- | --- | --- | --- |
| TNI | 73° C. | 71° C. | 81° C. | 80° C. |
| Δn (25° C.) | 0.083 | 0.082 | 0.083 | 0.081 |
| Δε (25° C.) | −3.3 | −3.3 | −3.1 | −3.2 |

TABLE 1-continued

| Physical properties as liquid crystal | Example 2 Liquid crystal composition (A-2) | Comparative Example 2 Liquid crystal composition (A-1) | Example 3 Liquid crystal composition (B-2) | Comparative Example 3 Liquid crystal composition (B-1) |
|---|---|---|---|---|
| n (20° C.) | 23 mPa · s | 22 mPa · s | 22 mPa · s | 22 mPa · s |
| Elastic constant $K_{33}$ (25° C.) | 20 pN | 13 pN | 21 pN | 14 pN |
| Response time (τd) (4.5 V→1 V) (25° C.) | 5.5 ms | 7.8 ms | 5.8 ms | 8.5 ms |

From the results above, it is apparent that according to the present embodiment, a liquid crystal display element having an improved response speed can be provided by using a liquid crystal compound having a bend elastic constant $K_{33}$ of 20 pN or more in a liquid crystal composition layer, while neither improving nor deteriorating all the characteristics as a liquid crystal display element.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A liquid crystal display element having:
a first substrate;
a second substrate; and
a liquid crystal composition layer interposed between the first substrate and the second substrate, the liquid crystal composition layer consisting of a liquid crystal composition,
wherein at least one of the first substrate and the second substrate has an electrode that controls the liquid crystal composition layer;
wherein the liquid crystal composition comprises at least one liquid crystal compound having a bend elastic constant $K_{33}$ of 100 pN or more,
the bend elastic constant $K_{33}$ being determined by one of the following (i) to (iii):
(i) the bend elastic constant $K_{33}$ is measured at a temperature T' which is 20° C. below from the transition temperature $T_{NI}$ of the isotropic liquid phase-nematic liquid crystal phase,
(ii) the bend elastic constant $K_{33}$ at the temperature T' is determined by extrapolation of the value of the bend elastic constant $K_{33}$ in the measurable range, and
(iii) the bend elastic constant $K_{33}$ at the temperature T' is determined by extrapolation of the value of the bend elastic constant $K_{33}$ in the mixture of the liquid crystal compound and other compounds exhibiting a nematic phase;
wherein the liquid crystal compound has a structure represented by the following general formula (1):

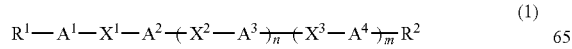

(1)

wherein $R^1$ and $R^2$ each independently represent a linear or branched alkyl group having 1 to 18 carbon atoms, a fluorine atom, a chlorine atom, a difluoromethyl group, a trifluoromethyl group, a difluoromethoxy group, or a trifluoromethoxy group, and at least one of $R^1$ and $R^2$ is an alkyl group in which one or more hydrogen atoms in the alkyl group are substituted with a hydroxyl group, and, in which one or more $CH_2$ groups in the alkyl group may be substituted with —O—, —S—, —CO—, —CO—O—, —O—CO—, —CO—S—, —S—CO—, —O—$SO_2$—, —$SO_2$—O—, —O—CO—O—, —CO—N($R^a$)—, or —N($R^a$)—CO— such that an oxygen atom and a sulfur atom are not directly adjacent to each other,
one or more hydrogen atoms in the alkyl group may be substituted with a CN group, $R^a$ in the —CO—N($R^a$)— and —N($R^a$)—CO— represents a hydrogen atom or a linear or branched alkyl group having 1 to 4 carbon atoms, one or more $CH_2$ groups in the alkyl group may be substituted with —CH=CH— or —C≡C—, and one or more hydrogen atoms in the alkyl group may be substituted with halogen,
$A^1$, $A^2$, $A^3$ and $A^4$ each independently represent any one of the following structures:

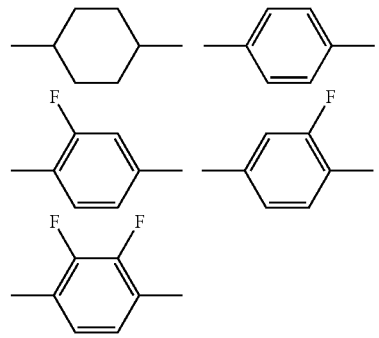

in the structures, one or more $CH_2$ groups of the cyclohexane ring may be substituted with an oxygen atom, one or more CH groups of the benzene ring may be substituted with a nitrogen atom, and further, one or more hydrogen atoms in the structure may be substituted with Cl, $CF_3$ or $OCF_3$,
$X^1$, $X^2$, and $X^3$ each independently represent a single bond, —CH=CH—, —CF=CF—, —C≡C—, —N=N—, —CH=N—N=CH—, —$CF_2CF_2$—, —$OCF_2$—, —$CF_2O$—, —CH=CH—CO—O—, or —O—CO—CH=CH—, and at least one of $X^1$, $X^2$, or $X^3$ represents —N=N—, —CH=N—N=CH—, —CH=CH—CO—O—, or —O—CO—CH=CH—, and n and m each independently represent 0 or 1, and n+m is 1 or 2, and the liquid crystal display element is in a TN mode, an IPS mode, a VA mode, an OCB mode, or an ECB mode.

2. The liquid crystal display element according to claim 1, wherein the liquid crystal display element is in the TN mode, the VA mode, the OCB mode, or the ECB mode, and has a plurality of pixels and each of the pixels can be independently controlled, the pixel has a pair of a pixel electrode and a common electrode, the first substrate has a common electrode, the second substrate has a pixel electrode, and the long axis of the liquid crystal molecule in the liquid crystal composition layer is substantially vertically or substantially horizontally aligned on the surface of the substrate.

3. The liquid crystal display element according to claim 1, wherein the liquid crystal display element has a plurality of pixels and each of the pixels can be independently controlled, the pixel has a pair of a pixel electrode and a common electrode, the both electrodes are provided on at least one substrate of the first substrate and the second substrate, and the long axis of the liquid crystal molecule in the liquid crystal composition layer is substantially horizontally aligned on the surface of the substrate.

4. The liquid crystal display element according to claim 1, wherein the liquid crystal composition constituting the liquid crystal composition layer represents a nematic liquid crystal phase.

5. The liquid crystal display element according to claim 4, wherein the dielectric anisotropy of the liquid crystal composition constituting the liquid crystal composition layer is positive.

6. The liquid crystal display element according to claim 4, wherein the dielectric anisotropy of the liquid crystal composition constituting the liquid crystal composition layer is negative.

7. The liquid crystal display element according to claim 1, wherein two or more $CH_2$ groups in the alkyl group of the at least one of $R^1$ and $R^2$ are substituted with —O—.

8. The liquid crystal display element according to claim 7, wherein three or more $CH_2$ groups in the alkyl group of the at least one of $R^1$ and $R^2$ are substituted with —O—.

9. The liquid crystal display element according to claim 1, wherein $X^1$, $X^2$, and $X^3$ each independently represent —CH=CH—, —CF=CF—, —C≡C—, —N=N—, —OCF$_2$—, or —CF$_2$O—, and at least one of $X^1$, $X^2$, and $X^3$ represents —N=N—.

10. The liquid crystal display element according to claim 5, wherein the liquid crystal composition further comprises a compound represented by the following general formula (IIIa) or (IIIb):

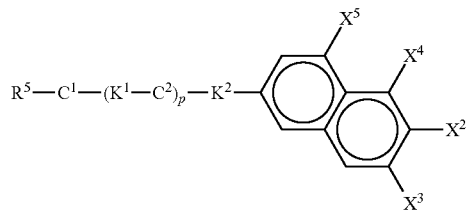

(IIIa)

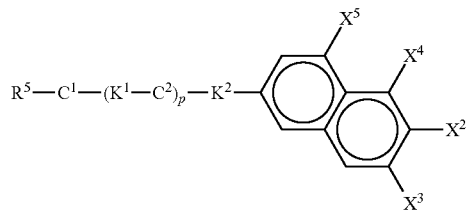

(IIIb)

wherein $R^5$ represents the same meaning as $R^1$ defined in claim 1, $C^1$ and $C^2$ each independently represent (d) a trans-1,4-cyclohexylene group, (e) a 1,4-phenylene group, or (f) a group selected from the group consisting of a 1,4-cyclohexenylene group, a 1,4-bicyclo(2.2.2)octylene group, a piperidine-1,4-diyl group, a naphthalene-2,6-diyl group, a 1,2,3,4-tetrahydronaphthalene-2,6-diyl group, and a decahydronaphthalene-2,6-diyl group, one methylene group present in the group (d) or two or more methylene groups not adjacent to each other therein may be substituted with —O— or —S—, one —CH= present in the group (e) or two or more —CH= not adjacent to each other therein may be substituted with a nitrogen atom, groups in the groups (d), (e), and (f) may be each substituted with a cyano group, a fluorine atom, or a chlorine atom, $K^1$ and $K^2$ each independently represent a single bond, —CH$_2$CH$_2$—, —(CH$_2$)$_4$—, —OCH$_2$—, —CH$_2$O—, —OCF$_2$—, —CF$_2$O—, —OCO—, —COO—, or —C≡C—, $X^1$, $X^3$, $X^4$, $X^5$, and $X^6$ each independently represent a hydrogen atom or a fluorine atom, $X^2$ represents a hydrogen atom, a fluorine atom, a chlorine atom, a cyano group, a trifluoromethyl group, a fluoromethoxy group, a difluoromethoxy group, a trifluoromethoxy group, a 2,2,2-trifluoroethyl group, or the same meaning as $R^1$ defined in claim 1, and p represents 0, 1, or 2.

11. The liquid crystal display element according to claim 6, wherein the liquid crystal composition further comprises at least one compound selected from the compounds represented by the following general formulae (LC1) through (LC4):

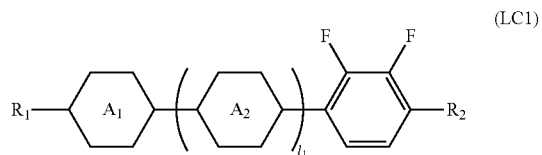

(LC1)

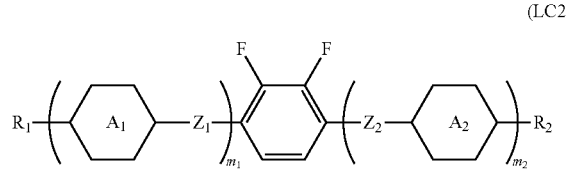

(LC2)

-continued

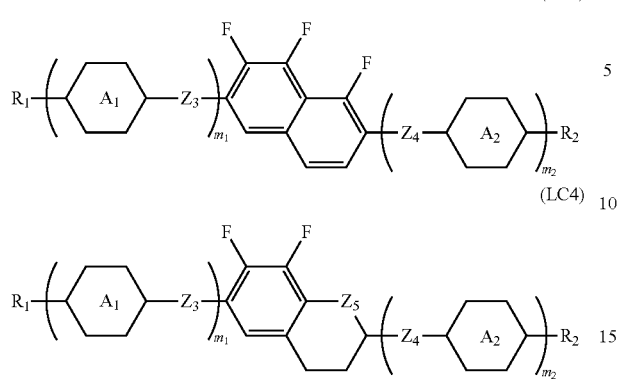

(LC3)

(LC4)

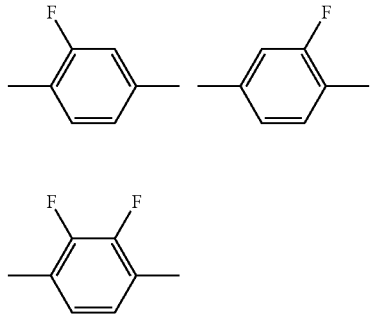

wherein $R_1$ and $R_2$ each independently represent an alkyl group having 1 to 15 carbon atoms, in which one or more $CH_2$ groups in the alkyl group may be substituted with —O—, —CH=CH—, —CO—, —OCO—, —COO—, —C≡C—, —CF$_2$O—, or —OCF$_2$— such that oxygen atoms are not directly adjacent to each other, one or two or more hydrogen atoms in the alkyl group may be arbitrarily substituted with halogen, $A_1$ and $A_2$ each independently represent any one of the following structures:

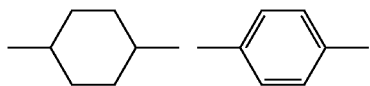

wherein one or more $CH_2$ groups of the cyclohexane ring may be substituted with an oxygen atom, one or more CH groups of the benzene ring may be substituted with a nitrogen atom, and further, one or more hydrogen atoms in the rings may be substituted with Cl, $CF_3$ or $OCF_3$, $Z_1$ to $Z_4$ each independently represent a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—, $Z_5$ represents a $CH_2$ group or an oxygen atom, at least one of the $Z_1$ and $Z_2$ is not a single bond, $l_1$ represents 0 or 1, $m_1$ and $m_2$ each independently represent 0 to 3, and $m_1 + m_2$ is 1, 2, or 3.

* * * * *